(12) United States Patent
Lakkis

(10) Patent No.: US 8,767,640 B2
(45) Date of Patent: Jul. 1, 2014

(54) METHOD AND APPARATUS FOR DIRECTIONAL CENTRALIZED CONTENTION BASED PERIOD IN A WIRELESS COMMUNICATION SYSTEM

(75) Inventor: Ismail Lakkis, San Diego, CA (US)

(73) Assignee: Adeptence, LLC, San Diego, CA (US)

( * ) Notice: Subject to any disclaimer, the term of this patent is extended or adjusted under 35 U.S.C. 154(b) by 560 days.

(21) Appl. No.: 12/911,732

(22) Filed: Oct. 26, 2010

(65) Prior Publication Data

US 2011/0110340 A1    May 12, 2011

Related U.S. Application Data

(60) Provisional application No. 61/259,621, filed on Nov. 9, 2009.

(51) Int. Cl.
*H04J 3/00*       (2006.01)
*H04W 4/00*    (2009.01)

(52) U.S. Cl.
USPC ................... 370/329; 370/338; 370/341

(58) Field of Classification Search
None
See application file for complete search history.

(56) References Cited

U.S. PATENT DOCUMENTS

| | | | |
|---|---|---|---|
| 6,038,455 A * | 3/2000 | Gardner et al. | 455/447 |
| 2001/0006517 A1 * | 7/2001 | Lin et al. | 370/348 |
| 2006/0209772 A1 * | 9/2006 | Fang et al. | 370/338 |
| 2010/0034141 A1 * | 2/2010 | Meylan | 370/328 |
| 2010/0128679 A1 * | 5/2010 | Kwon | 370/329 |

* cited by examiner

*Primary Examiner* — Chi Pham
*Assistant Examiner* — Soon-Dong D Hyun
(74) *Attorney, Agent, or Firm* — Steven J Shattil

(57) ABSTRACT

A method of communication includes allocating a portion of a superframe centralized contention based period where the access method is based on directional ALOHA. The centralized contention based period is divided into equal time slots, and each sequential set of N time slots forms a time cycle. During a time cycle, a wireless device listens for requests from other wireless devices while it changes its receiving direction from one time slot to another.

62 Claims, 13 Drawing Sheets

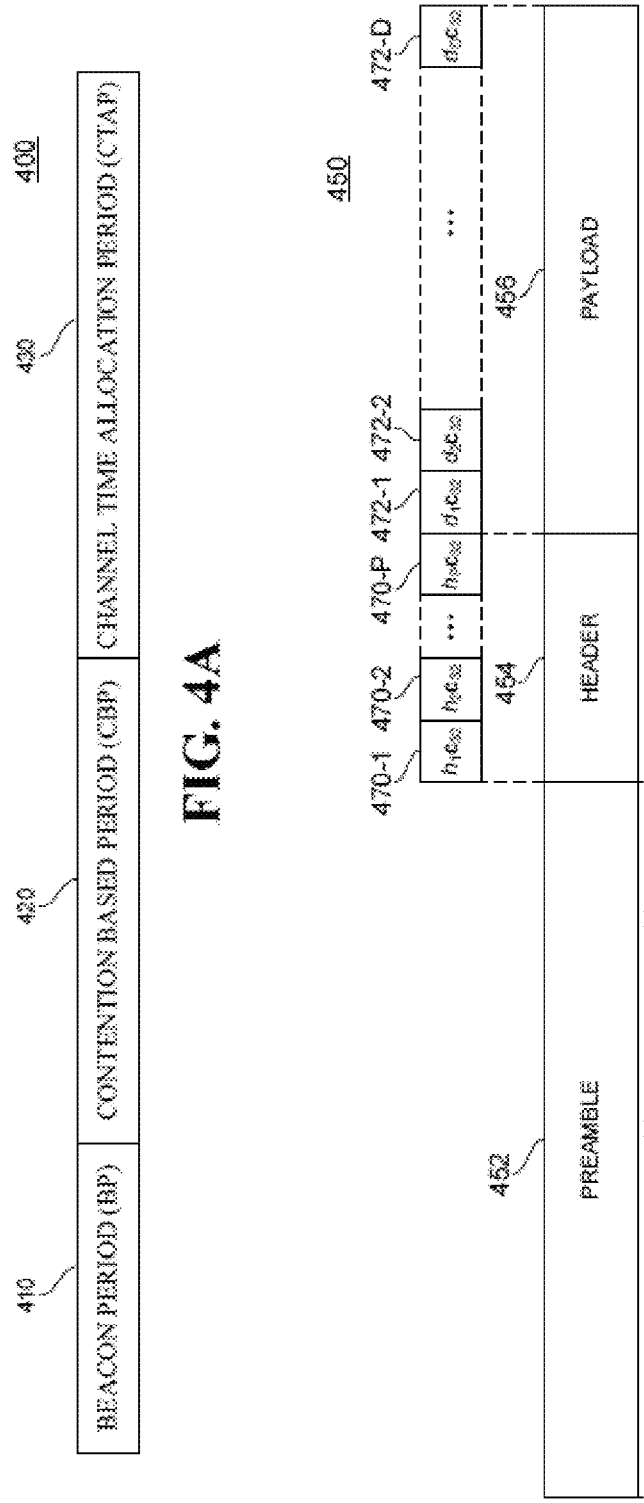

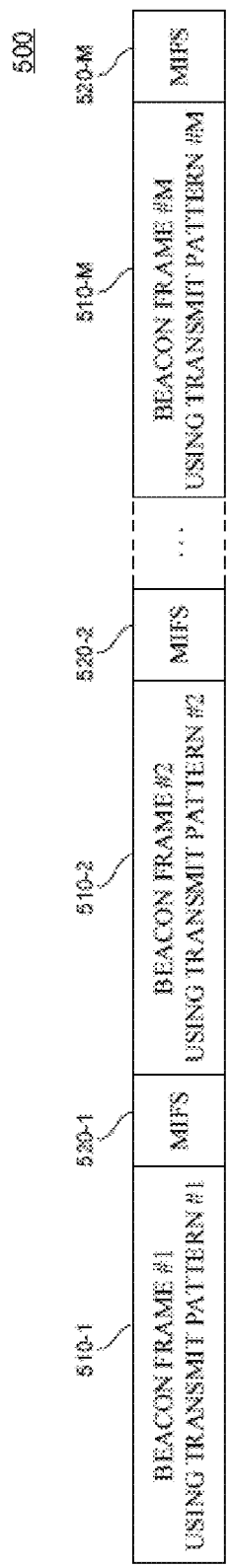
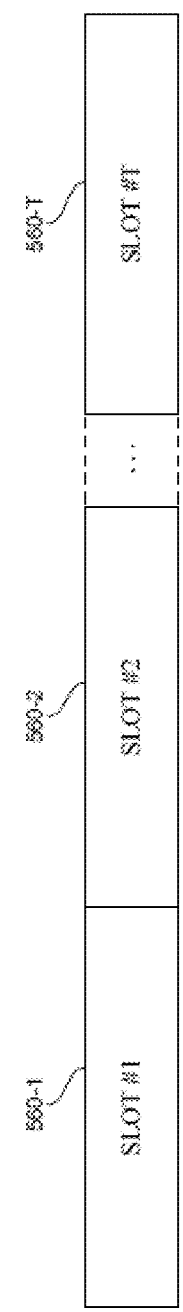
FIG. 5A
FIG. 5B

FIG. 8

METHOD AND APPARATUS FOR DIRECTIONAL CENTRALIZED CONTENTION BASED PERIOD IN A WIRELESS COMMUNICATION SYSTEM

CROSS-REFERENCE TO RELATED APPLICATIONS

This application claims priority under 35 U.S.C 119(e) to U.S. Provisional Application Ser. No. 62/259,621, filed Nov. 9, 2009.

FIELD

Certain aspects of the present disclosure relate to wireless communication, and particularly, to directional channel access in a wireless communication system.

BACKGROUND

In one aspect of the related art, a wireless communication system comprises a set of devices supporting at least one of a single-carrier (SC) physical (PHY) layer and an Orthogonal Frequency Division Multiplexing (OFDM) physical layer may be used for millimeter wave communications, such as the systems envisioned in the Institute of Electrical and Electronic Engineers (IEEE) 802.11.ad and IEEE 801.15.3c standards, and the Wireless Gigabit Alliance (WGA). The PHY layer may be configured for millimeter wave communications in the spectrum of 57 to 66 gigahertz (GHz), or Ultra Wide Band (UWB) communications in the spectrum of 3.1 to 10.6 GHz.

To allow interoperability between devices or networks that support either single-carrier or OFDM PHY modes, all devices further support a common mode referred to as a control PHY. Specifically, the common mode is a single-carrier base-rate mode employed by both OFDM and single-carrier devices to facilitate co-existence and interoperability between different devices and different networks. The common mode may be employed for beaconing, control, management, and communicating command and data frames (packets).

In another aspect of the related art, devices typically employ one or more Golay codes to provide spreading of different fields of a packet. Complementary codes, first introduced by Golay in M. Golay, "Complementary Series," IRE Transaction on Information Theory, Vol. 7, Issue 2, April 1961, are sets of complementary pairs of equally long, finite sequences of two kinds of elements. These complementary pairs have the property that the number of pairs of like elements with any given separation in one code is equal to the number of unlike elements with the same separation in the other code. The complementary codes first described by Golay were pairs of binary complementary codes with elements +1 and −1, wherein the sum of their respective aperiodic autocorrelation sequence is zero everywhere, except for the center tap.

In a wireless network, such as a wireless personal area network (WPAN) or a wireless local area network (WLAN), devices typically use a slotted ALOHA protocol or a carrier sense multiple access/collision avoidance (CSMA/CA) protocol to access the wireless medium. However, these access methods do not perform well when one or more devices use directional antenna patterns for their transmissions and/or receptions.

Therefore, there is a need in the art for a directional channel access protocol for devices that may have directional antenna systems, such as phased antenna arrays, directional antennas, or sectored antennas.

SUMMARY

Aspects disclosed herein may be advantageous to systems employing millimeter-wave WPANs or WLANs (such as the WLANs described by the IEEE802.11.ad, IEEE 802.11.ac and WGA protocols). However, the disclosure is not intended to be limited to such systems, as other applications may benefit from similar advantages.

According to an aspect of the disclosure, a superframe allocated by a first wireless device contains a centralized contention period and a distributed contention period. During the centralized contention period, the first device is part of any communication link between a pair of wireless devices. The distributed contention period may be used for peer-to-peer communications between wireless devices. The distributed contention period may be used for communication between the first device and at least one other wireless device.

According to another aspect of the disclosure, a superframe allocated by a first wireless device comprises a centralized contention period that is further divided into fixed equal-size time slots. The first device changes its receive antenna pattern (also referred to as its direction) from one time slot to another in a cyclic manner. Specifically, the first device uses a first receive direction in the first time slot, a second receive direction in the second time slot, and an $N^{th}$ receive direction in the $N^{th}$ time slot. The first device reuses its first receive direction in the $(N+1)^{th}$ time slot, its second receive direction in the $(N+1)^{th}$ time slot, its $N^{th}$ receive direction in the $(2N)^{th}$ time slot, etc.

According to another aspect of the disclosure, a method of communication is provided for accessing the centralized contention period by one or more other wireless devices (e.g., a second wireless device) to communicate with a first wireless device (a master device) using a directional slotted ALOHA protocol. The second device may transmit a frame on a time-slot boundary using a transmit antenna pattern selected from a predetermined set of transmit antenna patterns. The second device waits for a response from the first device. The first device cycles through its different receive patterns (i.e., directions) in each time slot.

According to another aspect of the disclosure, a method of communication is provided for allowing access to the centralized contention period by one or more wireless devices (e.g., a second wireless device) that communicate with a first wireless device (e.g., a master device) using a directional slotted ALOHA protocol. The second device maintains a set of N back-off window sizes equal in number to the first device's number N of receive directions. The second device may draw a set of N random numbers between one and the back-off window size(s). Each random number indicates a particular time cycle and time slot within the time cycle, which provides a period of time that the second device waits before transmitting the frame. Each time cycle comprises N time slots, and the selection of a time slot in a time cycle may be determined by the random number index in the set of the N random numbers.

According to another aspect of the disclosure, a method of communication is provided for accessing a centralized contention period that is used to communicate with a first wireless device (a master device) using a directional cycle-based ALOHA protocol. A second wireless device transmits a frame in the first time slot of a time cycle using one of a plurality of transmit antenna patterns from a set and waits for a response from the first device, which uses a first receive direction in the first time slot. The second device transmits the frame in the second time slot of a time cycle using the same transmit antenna pattern and waits for a response from the first device, which employs a second receive direction in the second time slot. The second device employs successive (e.g., sequential) time slots of a time cycle for transmitting the frame until it successfully decodes a response back from the first device, or until it has transmitted the frame in all N time slots.

According to another aspect of the invention, the centralized contention period may be used for authentication, association, service period requests, data communications, and/or direction acquisition and tracking Each time slot has a fixed duration, the time slot duration being at least equal to the duration of a transmit request frame, a first guard period (commonly known as an SIFS (Short Inter Frame Spacing)), the duration of a response frame, and a second guard period (e.g., a second SIFS).

According to another aspect of the disclosure, a communications method comprises transmitting a service period request (also known as a channel time allocation request) from a second wireless device to a first wireless device, wherein the service period request is transmitted using the directional slotted ALOHA protocol; receiving a service period allocation granted by the first device and transmitted using a second transmit pattern; and transmitting at least one frame from the second device to a destination device in the service period.

According to another aspect of the disclosure, a method of communication comprises employing at least one of a full double sweep and a partial double sweep for finding a pair of downlink working directions.

The partial double sweep comprises transmitting a set of request frames one at a time using a directional ALOHA protocol, in a first transmit direction from a second wireless device to a first wireless device. The first device changes its receive direction from one time slot to another in a cyclic manner (i.e., the first device repeats the same N receive directions in each time cycle). The second device listens for a response from the first device. If no response is detected, the second device sends a set of request frames using a second transmit direction one at a time using the directional ALOHA protocol, and the process of sending request frames and listening for a response may be repeated for up to all possible transmit directions or until the second device successfully detects a response from the first device. The second device uses the direction(s) for which it successfully decoded a response from the first device as a working direction(s) that it uses for further communications with the first device.

The full double sweep comprises transmitting a set of request frames, one at a time using the directional ALOHA protocol, in a first direction from the second device to the first device. The first device changes its receive direction from one time slot to another in a cyclic manner. The second device sends another set of request frames in a second transmit direction to the first device, one at a time using the directional ALOHA protocol. The process of sending request frames is repeated for all transmit directions of the second device. The second device selects the direction(s) with the highest link quality indicator (LQI) as a preferred direction(s) for communicating with the first device.

In accordance with one aspect of the invention, a wireless system comprises means for selecting a sequence of time slots paired with a plurality of transmit directions for transmitting at least one request frame from a first wireless device to a second wireless device; means for listening for the at least one request frame at the second wireless device by employing a different one of a plurality of receive directions in each of the time slots; means for transmitting at least one response frame from the second wireless device to the first wireless device; means for listening for the at least one response frame at the first wireless device; and means for selecting a preferred set of uplink and downlink directions for further communication between the first wireless device and the second wireless device. Means for selecting the sequence of time slots may include, by way of example, but without limitation, a digital computer system comprising a memory for storing instructions and a processor for executing the instructions. Means for listening may include, by way of example, but without limitation, any wireless radio receiver employing directional beam patterns and configured to detect, demodulate, and/or decode received transmissions. Means for transmitting may include, by way of example, but without limitation, any wireless radio transmitter employing directional beam patterns and configured for generating a response frame and other data signals, and coupling data signals into a wireless communication channel. Means for selecting a preferred set of uplink and downlink directions may include, by way of example, but without limitation, a digital computer system comprising a memory for storing instructions and a processor for executing the instructions, and may share one or more components used by the means for selecting the sequence of time slots.

In accordance with another aspect of the invention, a wireless device comprises means for selecting a sequence of time slots paired with a plurality of transmit directions for transmitting at least one request frame from the first wireless device to a second wireless device, the second wireless device employing a different one of a plurality of receive directions for each of the time slots; means for listening for at least one response frame transmitted by the second wireless device; and means for selecting a preferred set of uplink and downlink directions for further communication between the first wireless device and the second wireless device. Means for selecting the sequence of time slots may include, by way of example, but without limitation, a digital computer system comprising a memory for storing instructions and a processor for executing the instructions. Means for listening may include, by way of example, but without limitation, any wireless radio receiver employing directional beam patterns and configured to detect, demodulate, and/or decode received transmissions. Means for selecting a preferred set of uplink and downlink directions may include, by way of example, but without limitation, a digital computer system comprising a memory for storing instructions and a processor for executing the instructions, and may share one or more components used by the means for selecting the sequence of time slots.

In accordance with another aspect of the invention, a wireless device comprises means for employing a different one of a plurality of receive directions for each of a sequence of time slots to listen for at least one request frame transmitted by a second wireless device; means for transmitting at least one response frame to the second wireless device in response to a received request frame; and means for selecting a preferred set of uplink and downlink directions for further communication between the first wireless device and the second wireless device. Means for employing a different one of a plurality of receive directions for each of a sequence of time slots to listen for at least one request frame transmitted by a second wireless device may include, by way of example, but without limitation, any wireless radio receiver employing directional beam patterns and configured to detect, demodulate, and/or decode received transmissions. Means for transmitting may include, by way of example, but without limitation, any wireless radio transmitter employing directional beam patterns and configured for generating a response frame and other data signals, and coupling data signals into a wireless communication channel. Means for selecting a preferred set of uplink and downlink directions may include, by way of example, but without limitation, a digital computer system comprising a memory for storing instructions and a processor for executing the instructions.

In accordance with another aspect of the invention, a wireless device comprises means for generating a plurality of time cycle numbers, the plurality of time cycle numbers being equal to a plurality of receive directions employed by a second wireless device, each of the time cycle numbers being associated with one of the receive directions and having a value within a predetermined back-off window size; means for sequentially organizing the plurality of time cycle numbers with respect to their values for producing a sequence of time cycle numbers; means for generating a sequence of time slot numbers from the sequence of time cycle numbers and the plurality of receive directions, the sequence of time slot numbers being used to select time slots for transmitting a frame to the second wireless device. Means for generating the plurality of time cycle numbers, means, means for sequentially organizing the plurality of time cycle numbers, and means for generating the sequence of time slot numbers may include, by way of example, but without limitation, a digital computer system comprising a memory for storing instructions and a computer processor for executing the instructions.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 4A illustrates a conventional superframe structure in accordance with certain aspects of the present disclosure.

FIG. 4B illustrates a frame structure in accordance with certain aspects of the present disclosure.

FIG. 5A illustrates a directional beacon period in accordance with certain aspects of the present disclosure.

FIG. 5B illustrates a contention period using a slotted ALOHA protocol according to certain aspects of the present disclosure.

FIG. 8 illustrates a directional slotted ALOHA protocol in accordance with certain aspect of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope and spirit of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

AN EXAMPLE WIRELESS COMMUNICATION SYSTEM

The techniques described herein may be used for various broadband wireless communication systems, including communication systems that are based on a single carrier transmission and OFDM. Aspects disclosed herein may be advantageous to systems employing Ultra Wide Band (UWB) signals including millimeter-wave signals, Code Division Multiple Access (CDMA) signals, and OFDM. However, the present disclosure is not intended to be limited to such systems, as other coded signals may benefit from similar advantages.

Figure 1:
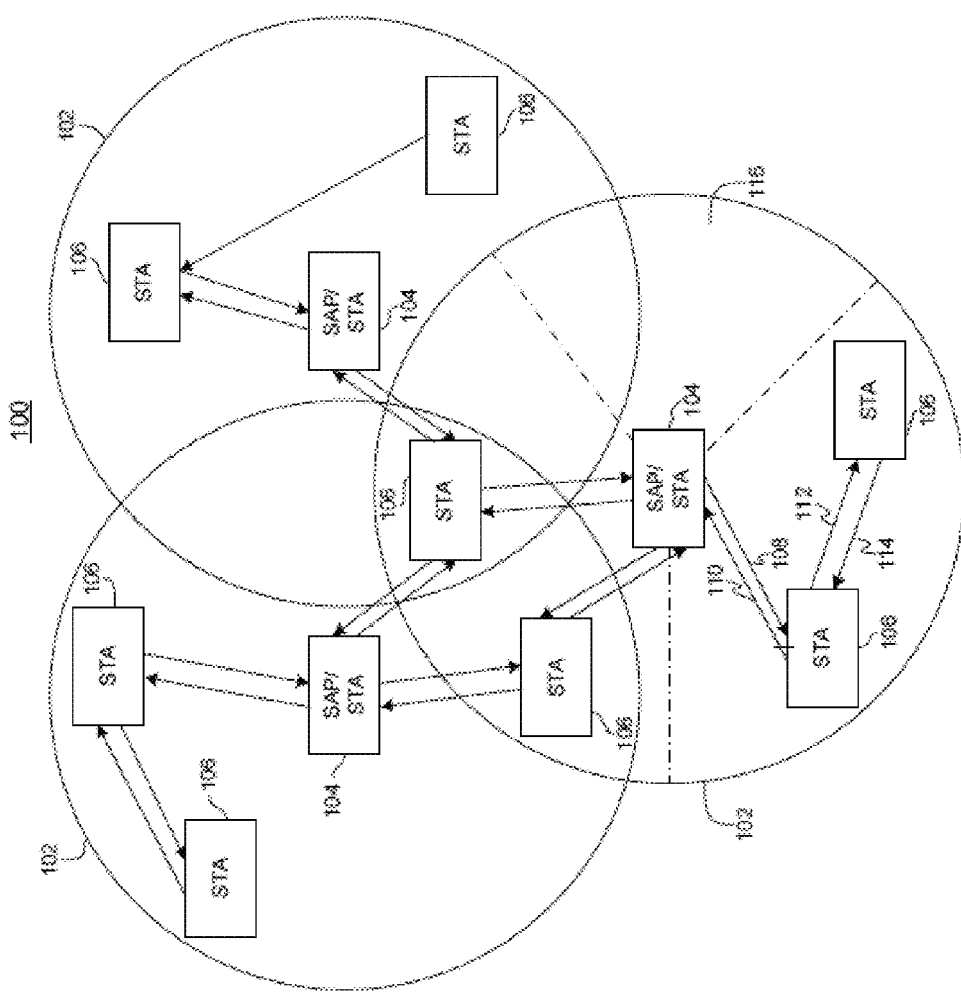
FIG. 1 illustrates a wireless communication system in accordance with certain aspects of the present disclosure.

FIG. 1 illustrates an exemplary wireless communication system 100 in which aspects of the present disclosure may be employed. The wireless communication system 100 may be a broadband wireless communication system compatible with the IEEE 802.11 and 802.15. The wireless communication system 100 may provide communication for a number of Basic Service Sets (BSSs) 102, each of which may be serviced by a Service Access Point (SAP) 104. A SAP 104 may be a fixed station or a mobile station that communicates with Stations (STAs) 106. A BSS 102 may alternatively be referred to as cell, piconet or some other terminology. The SAP 104 may alternatively be referred to as a base station, a piconet controller, a Node B, a wireless device, a master device, or some other terminology.

FIG. 1 depicts various stations 106 dispersed throughout the system 100. The stations 106 may be fixed (i.e., stationary) or mobile. Each STA of the plurality of STAs 106 implements a MAC and PHY interface to the wireless medium of the network 100. The STAs 106 may alternatively be referred to as remote stations, access terminals, terminals, subscriber units, mobile stations, wireless devices, user equipment, etc. The STAs 106 may be wireless devices, such as cellular phones, personal digital assistants (PDAs), handheld devices, wireless modems, laptop computers, personal computers, etc.

Under IEEE 802.11 and 802.15, one STA assumes the role of a coordinator (master) of the BSS. This coordinating STA is referred to as a Service Access Point (SAP) and is illustrated in FIG. 1 as the SAP 104. Thus, the SAP 104 may include the same station functionality of the plurality of other stations (STAs 106), but provides coordination and management for the network. For example, the SAP 104 provides services, such as basic timing for the network 100 using a beacon; and management of any Quality of Service (QoS) requirements, power-save modes, and network access control. A wireless device with similar functionality as described for the SAP 104 in other systems may be referred to as an piconet controller, a base station, a base transceiver station, a station, a terminal, a node, an access terminal acting as an access point, or some other suitable terminology. The SAP 104 coordinates the communication between the various stations (STAs 106) in the network 100 using a frame structure referred to as a superframe. Each superframe is bounded in time by beacon periods. The SAP 104 may be coupled to a system controller to communicate with other networks or other SAPs.

A variety of algorithms and methods may be used for transmitting information in the wireless communication system 100 between the SAPs 104 and the STAs 106 and between the STAs 106 themselves. For example, signals may be communicated between the SAPs 104 and the STAs 106 in accordance with a CDMA technique and signals may be sent and received between STAs 106 in according with an OFDM technique. If this is the case, the wireless communication system 100 may be referred to as a hybrid CDMA/OFDM system.

A communication link that facilitates transmission from an SAP 104 to an STA 106 may be referred to as a downlink (DL) 108, and a communication link that facilitates transmission from an STA 106 to an SAP 104 may be referred to as an uplink (UL) 110. Alternatively, a downlink 108 may be referred to as a forward link or a forward channel, and an uplink 110 may be referred to as a reverse link or a reverse channel. When two STAs communicate directly with each other, a first STA will act as the master of the link, and the link from the first STA to the second STA will be referred to as the downlink 112, and the link from the second STA to the first STA will be referred to as the uplink 114.

A BSS 102 may be divided into multiple sectors. A sector 116 is a physical coverage area within the BSS 102. SAPs 104 within the wireless communication system 100 may utilize antennas that concentrate the flow of power within a particular sector 116 of the BSS 102. Such antennas may be referred to as directional antennas.

Figure 2:
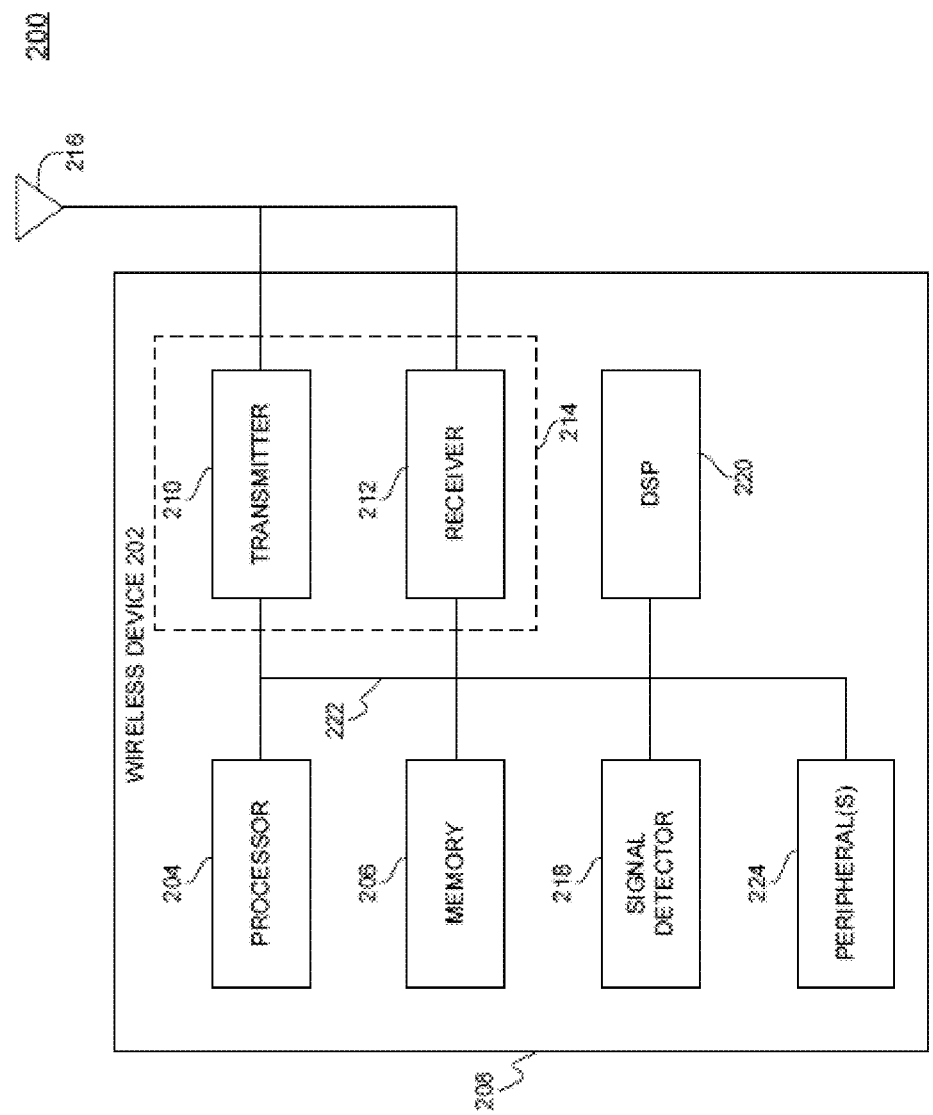
FIG. 2 illustrates various components that may be utilized in a wireless device in accordance with certain aspects of the present disclosure.

FIG. 2 illustrates various components that may be utilized in a wireless device 210 employed within the wireless communication system 100. The wireless device 210 is an example of a device that may be configured to implement the various methods described herein. The wireless device 202 may be an SAP 104 or an STA 106.

The wireless device 202 may include a processor 204 that controls operation of the wireless device 202. The processor 204 may also be referred to as a central processing unit (CPU). Memory 206, which may include one or both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may include one or more wired peripherals 224 such as USB, HDMI, or PCIE. The wireless device 202 may also include (not shown) multiple transmitters, multiple receivers, multiple transceivers, and/or multiple antennas.

The wireless device 202 may also include a signal detector 218 that may be used to detect and quantify the level of signals received by the transceiver 214. The signal detector 218 may detect such signals as total energy, energy per subcarrier per symbol, power spectral density, and/or other signal measurements that are known in the art. The wireless device 202 may also include a digital signal processor (DSP) 220 for processing signals.

The various components of the wireless device 202 may be coupled together by a bus system 222, which may include a power bus, a control signal bus, and a status signal bus, in addition to a data bus.

Figure 3:
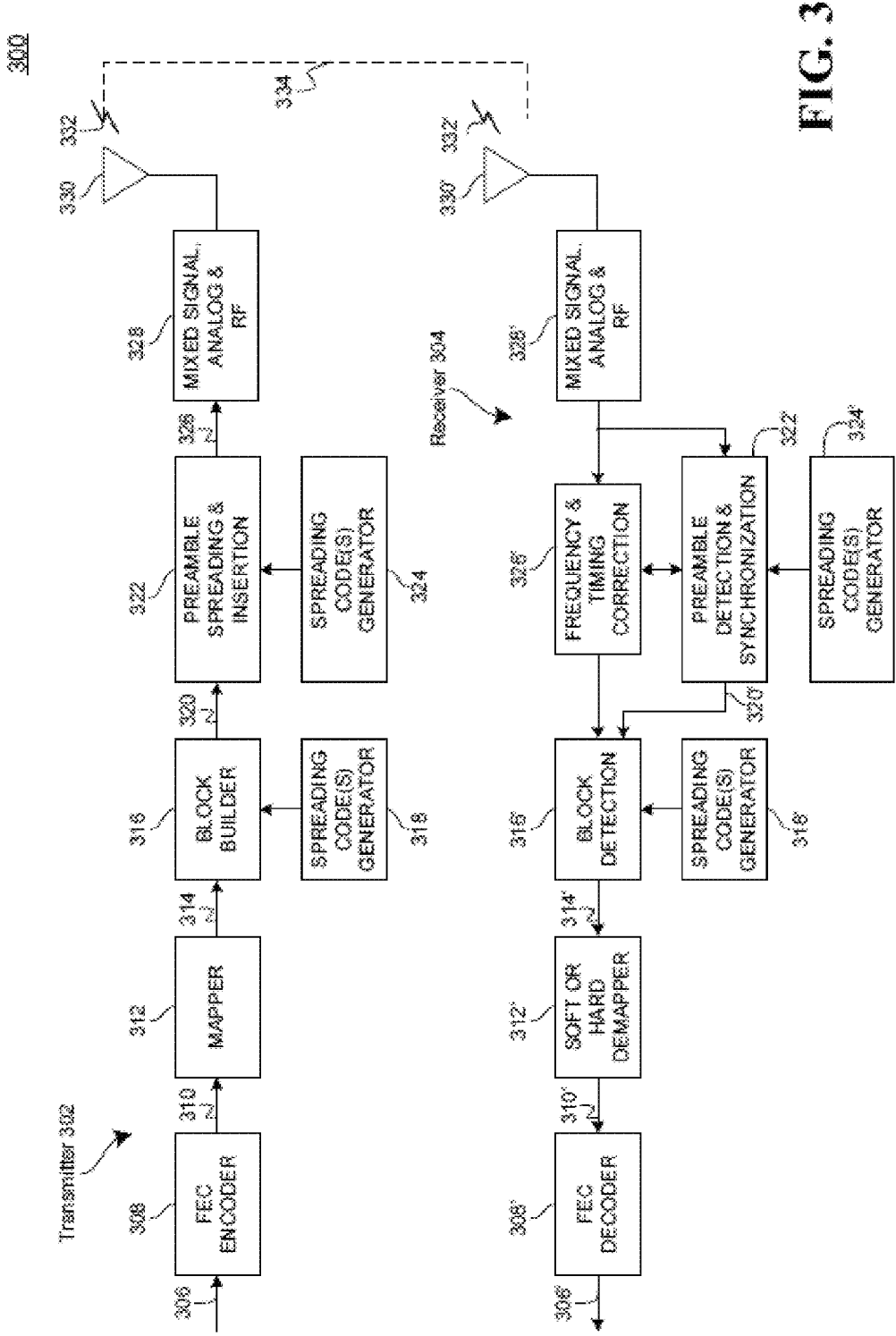
FIG. 3 illustrates an example transceiver that may be used within a wireless communication system in accordance with certain aspects of the present disclosure.

FIG. 3 illustrates an exemplary transmitter 302 that may be used within a wireless communication system 100 that utilizes CDMA or some other transmission technique. Portions of the transmitter 302 may be implemented in the transmitter 210 of a wireless device 202. The transmitter 302 may be implemented in a base station 104 for transmitting data 330 to a user terminal 106 on a downlink 108. The transmitter 302 may also be implemented in a station 106 for transmitting data 330 to a service access point 104 on an uplink 110.

Data 306 to be transmitted are shown being provided as input to a forward error correction (FEC) encoder 308. The FEC encoder 308 encodes the data 306 by adding redundant bits. The FEC encoder 308 may encode the data 306 using a convolutional encoder, a Reed Solomon encoder, a Turbo encoder, a low density parity check (LDPC) encoder, etc. The FEC encoder 308 outputs an encoded data stream 310. The encoded data stream 310 is input to a mapper 314. The mapper 314 may map the encoded data stream onto constellation points. The mapping may be done using some modulation constellation, such as binary phase-shift keying (BPSK), quadrature phase-shift keying (QPSK), 8 phase-shift keying (8PSK), quadrature amplitude modulation (QAM), constant phase modulation (CPM), etc. Thus, the mapper 312 may output a symbol stream 314, which may represents one input into a block builder 310. Another input in the block builder 310 may include one or more spreading codes produced by a spreading code generator 318.

The block builder 310 may be configured for partitioning the symbol stream 314, into sub-blocks and creating OFDM/OFDMA symbols or single-carrier sub-blocks. The block builder 310 may append each sub-block with a guard interval, a cyclic prefix, or a spreading sequence from the spreading codes generator 318. Furthermore, the sub-blocks may be spread by one or multiple spreading codes from the spreading code generator 318.

Output signal 320 may be pre-pended by a preamble 322 generated from one or more spreading sequences from the spreading code generator 324. The output stream 326 may then be converted to analog and up-converted to a desired transmit frequency band by a radio frequency (RF) front end 328, which may include a mixed signal section and an analog section. An antenna 330 transmits the resulting signal 332.

FIG. 3 illustrates an exemplary receiver 304 that may be used within a wireless device 202 that uses CDMA and/or OFDM/OFDMA. Portions of the receiver 304 may be implemented in the receiver 212 of a wireless device 202. The receiver 304 may be implemented in a station 106 for receiving data 306 from a service access point 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be down-converted to a baseband signal by an RF front-end 328' which may include a mixed signal and an analog portion. Preamble detection and synchronization component 322' may be used to establish timing, frequency and channel synchronization using one or multiple correlators that correlate with one or multiple spreading codes generated by a spreading code generator 324'.

The output of the RF front end block 328' is input to the frequency and timing correction component 326' along with the synchronization information from component 322'. The outputs from components 326' and 322' are input to a block detection component 316'. When OFDM/OFDMA is used, the block detection may include cyclic prefix removal and fast Fourier transform (FFT). When single-carrier transmissions are used, the block detection may include de-spreading and equalization.

A de-mapper 312' may perform the inverse of the symbol mapping operation performed by the mapper 312, thereby outputting soft and/or hard decisions 310'. The soft and/or hard decisions 310' are input to the FEC decoder 308', which provides a stream of data estimates 306'. Ideally, this data stream 306' corresponds to the data 306 that was input to the transmitter 302.

The wireless system 100 illustrated in FIG. 1 may be a UWB/millimeter wave system operating in the band including the 57-64 GHz unlicensed band specified by the Federal Communications Commission (FCC).

Superframe Structure

FIG. 4A illustrates a superframe 400 used for SAP timing in the network 100. In general, a superframe is a basic time-division structure containing a beacon period (BP) 410, a contention based period (CBP) 420, and a channel time allocation (CTAP) period 430, also known as service periods (SPs). The superframe is also known as the beacon time (BT) or beacon interval (BI). In the superframe 400, a beacon period (BP) 410 is provided during which an SAP such as the SAP 104 sends beacon frames.

A Contention Based Period (CBP) 420 is used to communicate command, control, management, and data frames either between the SAP 104 and at least one of the plurality of STAs 106 in the network 100, or between any set of STAs 106 in the network 100. The access method for the CBP 420 may be based on a slotted ALOHA or a carrier sense multiple access with collision avoidance (CSMA/CA) protocol.

A Channel Time Allocation Period (CTAP) 430, which is based on a Time Division Multiple Access (TDMA) protocol, is provided by the SAP 104 to allocate time for the plurality of STAs 106 to use the channels in the network 100. Specifically, the CTAP is divided into one or more time periods (of different sizes), referred to as Channel Time Allocations (CTAs). The CTAs, also known as Service Periods (SPs), are typically allocated by the SAP 104 to pairs of stations, one pair of stations to a CTA. Thus, the access mechanism for CTAs is TDMA-based.

FIG. 4B shows an exemplary frame structure 450 that may be used for a single-carrier, OFDM, or common-mode frame. As used herein, the term, frame, may also be used interchangeably with the term, packet. The frame structure 450 includes a preamble 452, a header 454, and a packet payload 456. The common mode may use Golay codes for all three fields, i.e., for the preamble 452, the header 454 and the packet payload 456. The common-mode signal uses Golay spreading codes with chip-level/2-BPSK modulation to spread the data therein. The header 454, which is a physical layer convergence protocol (PLCP) conforming header, and the packet payload 456, which is a physical layer service data unit (PSDU), includes symbols spread with a Golay code of length 32 or 64. Various frame parameters, including, by way of example, but without limitation, the number of Golay-code repetitions and the Golay-code lengths, may be adapted in accordance with various aspects of the frame structure 450. In one aspect, Golay codes employed in the preamble may be selected from length-64 or length-128 Golay codes. Golay codes used for data spreading may comprise length-32 or length-64 Golay codes.

Referring to FIG. 4B, the preamble 452 includes a packet sync sequence field 458, an optional start frame delimiter (SFD) field 460, and a channel-estimation sequence field 462.

The packet sync sequence field 458 is a repetition of ones (or a repetition of minus ones, or an alternating sequence of ones and minus ones) spread by one of the length-128 complementary Golay codes (a128, b128) as represented by codes 464-1 to 464-Q in FIG. 4B. The SFD field 460 comprises a specific code such as {−1, +1} that is spread by one of the length-128 complementary Golay codes (a128, b128), as represented by codes 466-1 and 466-2 in FIG. 4B. The CES field 462 may be spread using a pair of length-256 complementary Golay codes (a256, b256), such as represented by codes 458-1 and 458-2, and may further comprise a cyclic postfix 458-3, which is a length-128 Golay code. The CES field 462 may further comprise a cyclic prefix (not shown), where CP may be used as a Cyclic Prefix or Postfix. A cyclic postfix for code a256 (depicted by 458-1) is shown as CP128 458-3 and is a copy of the first 128 chips of a256 (458-1). The sync field 458 is typically used for AGC (Automatic Gain Control) setting, antenna selection, DC offset removal, packet detection, timing, and frequency and channel acquisition. The SFD field 460 may be used to indicate the end of the sync field 458. The CES field 462 is typically used for multipath channel estimation and fine frequency estimation.

In one aspect of the disclosure, a dual-mode millimeter wave system employing single-carrier modulation and OFDM is provided with a single-carrier common-mode signaling. The common mode, also known as control PHY (Physical layer), is a single-carrier mode used by both single-carrier and OFDM devices for beaconing, signaling (such as control and management), beamforming, and base-rate data communications.

Directional Aloha Protocol

In typical systems, an SAP transmits a single beacon frame in the beacon period (BP) 410, such as depicted in FIG. 4A. This is the case in IEEE 802.11 where a SAP transmits the beacon using a single antenna pattern that covers the region of space of interest. In millimeter wave systems, such as the systems being considered in IEEE 802.11ad and WGA, stations may not be omni-capable on transmission or reception. That is, stations might not be able to cover the region of space of interest in a single transmission or reception pattern. Such stations are referred to herein as directional stations. An omni-capable device is a special case of a directional station with a single direction. Directional STAs include STAs that use switched antennas, sectored antennas, and/or phased antenna arrays. In what follows, antenna patterns are referred to as directions, and it should be understood that an antenna direction (e.g., an antenna pattern) does not necessarily imply a specific geometric coverage, such as antenna beams. An antenna direction (e.g., a pattern) may take any three-dimensional geometric shape, including, but not limited to, typical beam and sectored patterns. Furthermore, a station may use different directions for transmission and reception.

According to one aspect of the invention, during the beacon interval 410 in FIG. 4A, a directional SAP transmits a plurality of beacon frames using a plurality of transmit antenna patterns, denoted by indices #1 to #M. This is further illustrated in FIG. 5A, wherein an SAP with M transmit patterns may transmit M beacon frames, wherein the first beacon frame 510-1 is transmitted in a first transmit direction #1, and the second beacon frame 510-2 is transmitted in a second transmit direction #2, and the $M^{th}$ beacon frame 510-M is transmitted in a $M^{th}$ transmit direction #M. The beacon packets may be separated by Minimum InterFrame Spacing (MIFS) guard intervals, such as represented by 520-1 to 520-M. Each beacon frame contains one or two counters (typically in the header of the frame) containing information about the index of the current beacon frame and the total (or remaining) number of beacon frames M. With the exception of the content of the counters, the content of all beacon frames may be identical.

For an SAP that is omni-capable on transmission (i.e., an SAP with a single antenna pattern covering the region of interest), M=1. For an SAP with sectorized antennas, M is the number of sectors that the SAP is able to support. Similarly, when an SAP is provided with switching transmit diversity antennas, M may represent the number of transmit antennas in the SAP. Various approaches to the structure of the Q-omni beacon frame may be used.

The following disclosure relates to the general case of stations (STAs), including SAPs, having transmit directions and receive directions that may be different (referred to as asymmetric STAs). Stations having identical transmit directions and receive directions (referred to as symmetric STAs) are a special case.

As discussed above, a SAP broadcasts a set of M beacon frames, typically in every superframe. Each beacon frame contains all timing information about the superframe and, optionally, information about some or all of the STAs that are members of the BSS, including the beamforming capabilities of each STA. The STA beamforming capabilities are obtained by the SAP during association. An STA beamforming capability includes a number of transmit and receive directions. An STA may use a different number of transmit and receive directions for different tasks. For example, the number of directions could be a number of antennas for an STA with switched antennas, a number of sectors for an STA with sectored antennas, or a number of coarse patterns for an STA with a phase antenna array. A phased antenna array can generate a set of patterns that may overlap, each pattern covering a part of the region of the space of interest.

The following notation is used to clarify different aspects of the disclosure. Let M and N be the total number of SAP's transmit and receive antenna patterns, respectively, and let P and Q be the total number of an STA's transmit and receive antenna patterns respectively. As mentioned above, the number of directions M, N, P, and Q may be changed. As an example, an STA may use P=2 directions during association and P=16 directions in a CTAP. Furthermore, an STA may initially use a coarse number of broad directions and adapt either or both the directions and the number of directions to provide a set of fine directions.

An STA may perform the following steps in order to associate (i.e., become a member of the BSS) with the SAP. First, the STA searches for a beacon from the SAP. The STA then detects at least one of the M directional beacon frames and acquires knowledge of the superframe timing, the number of the SAP's transmit and receive directions (i.e. M and N), duration of the CBP, and, optionally, the possible capabilities of each of the STA members. In an aspect of the disclosure, the STA acquires and tracks the best SAP transmit direction by measuring a link quality indicator (LQI) from all K directional beacon packets transmitted by the SAP. In one aspect of the disclosure, the LQI is a metric of the quality of the received signal. Examples of an LQI include, but are not limited to, an RSSI (Received Signal Strength Indicator), an SNR (Signal to Noise Ratio), an SNIR (Signal to Noise and Interference Ratio), an SIR (Signal to Interference Ratio), a preamble detection, a BER (Bit Error Rate), and a PER (Packet Error Rate).

According to one aspect of the disclosure, an STA may detect a beacon packet by sweeping over its set of N receive directions over one or more superframes. Upon detection of at least one of the beacon packets, the STA acquires a vast amount of information. For example, the STA may acquire knowledge of the following: a) the SAP's number of transmit and receive directions during beaconing (i.e., M and N); b) the index of SAP's preferred transmit direction (e.g., the beacon packet with the highest LQI) from the SAP to the STA, referred to as the SAP's transmit direction number m. Direction number m is acquired by the STA by sorting the LQIs from the M beacon frames transmitted by the SAP in different directions and received by the STA using its Q receive directions. There are M×Q combinations in total, and one combination yields a best LQI. Alternatively, the STA may use the direction corresponding to the first beacon frame it successfully detects as its preferred direction; c) the index of the STA's preferred receive direction when listening to the SAP. The STA's preferred receive direction is referred to as direction q; d) the list of devices that are members of the current BSS, and some or all of their capabilities in terms of PHY support (single carrier support or OFDM support, data rates, number of transmit and receive directions, etc.); e) the structure and duration of different fields of the superframe, such as the start time of CBP, duration of the CBP, superframe duration, etc.; and f) the time allocations of SPs in the CTAP.

Upon detection of the beacon, the STA goes through the association process to become a member of the BSS. After association, the STA may exchange data packets with another STA or with the SAP in accordance with one of two procedures. In accordance with a first procedure, the STA may access the contention-based period using a slotted ALOHA protocol or a carrier sense multiple access with collision avoidance CSMA/CA protocol in a manner similar to that specified in the IEEE 802.11 protocol. In accordance with a second procedure, the STA requests a service period (SP) from the SAP for the purpose of exchanging data packets with another STA. If the request is accepted by the SAP, the SAP grants access to the demanding STA and broadcasts a time allocation in the beacon. The SAP may provide information about the source STA and address STA(s). The source and destination STAs may then exchange data packets in the dedicated time allocated service period.

The association process involves transmitting an association request from the STA to the SAP, and transmitting an association response from the SAP to the STA. This process may involve exchanges of many frames before the STA is considered to be associated. Furthermore, an STA might have to be authenticated prior to association. Authentication may be part of the association process.

For networks such as IEEE 802.11, the SAP and STAs have a single transmit antenna pattern, and the association process is relatively simple and straightforward. IEEE 802.11 uses a CSMA/CA protocol. To clarify the association process, a simple slotted ALOHA protocol is shown in FIG. 5B. The contention based period is divided into equal size time slots 560-1 to 560-T, where the slot duration encompasses the duration of an association request frame from the STA, plus the duration of a guard time, such as a first SIFS, plus the duration of an association response frame from the SAP, plus the duration of another guard time (such as a second SIFS). An STA may send a request only at the beginning of a time slot. If the STA does not detect a response after a SIFS guard time, it regards the request as unsuccessful. For example, a collision may have occurred with a request sent by another STA to the SAP during the same time slot. In this case, the STA may retransmit the request in a future slot determined by some probability law calculation. Typically, a binary exponential back-off procedure is used. A STA draws a random number $R_1$ between 1 and $W=2^s$ (where W is referred to here as initial back-off window size), and transmits a request frame in time-slot number $R_1$. If the request is unsuccessful, then the back-off window size is doubled and the STA draws another random number $R_2$ between 0 and $2^{(q+1)}$ and retransmits the request in time-slot number $R_1+R_2$. Every time the request is unsuccessful, the back-off window size is doubled until it reaches a threshold $2^S$, after which the back-off window is constant. If the maximum back-off window is reached and the number of transmission trials exceeds a predetermined number, the station ceases its attempts to transmit the frame. On the other hand, if the transmission is successful, the back-off window size is reset back to $2^s$ for the next transmission.

For directional STAs and/or SAPs, the previously described slotted ALOHA procedure may not perform well, especially when an STA does not know which direction to use for transmissions to the SAP and the SAP does not know which direction to use for reception. The same problem occurs with CSMA/CA, since good STA-to-SAP and SAP-to-STA directions are not known at either side of the link. Furthermore, the hidden-node problem is worse, since stations cannot hear each other due to their directional antenna patterns. In addition, the problem is more severe if the contention based period is used for direction finding, authentication, association, service period (time allocation) request, data frame exchange between peer-to-peer STAs, and data frame exchanges between the STA and SAP.

Figure 6A:
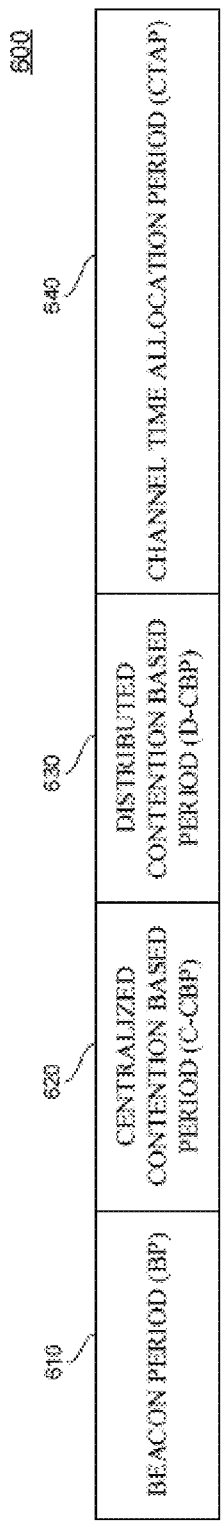
FIG. 6A illustrates a superframe structure in accordance with certain aspects of the present disclosure.

According to one aspect of the invention, the contention based period is divided into two portions, a centralized contention based period (C-CBP) 620 and a distributed contention based period (D-CBP) 630, such as shown in FIG. 6A. In the C-CBP 620, the SAP is a party to any communication. That is, communications occurs between the SAP and other STAs. In the D-CBP, the SAP is not necessarily part of every communication. That is, communications may occur between two STAs, and not the SAP.

In the following, a frame transmission from an STA to the SAP is referred to as a request frame, and frame transmission from the SAP to an STA is referred to as a response frame.

Figure 6B:
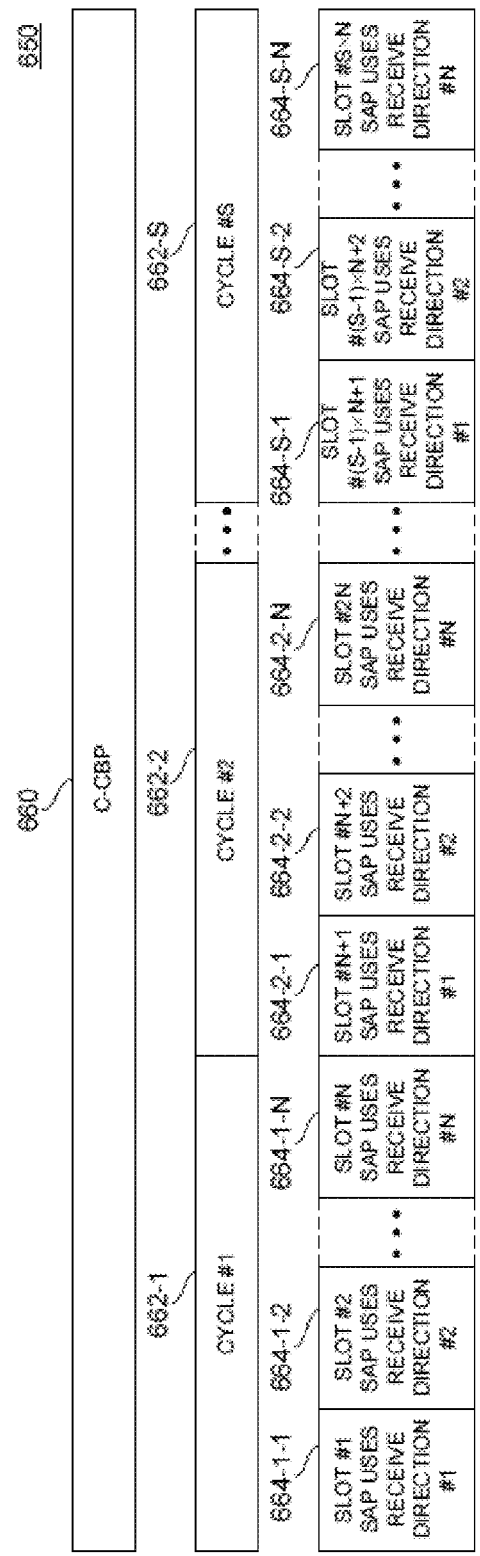
FIG. 6B illustrates a centralized contention period using a directional ALOHA protocol according to certain aspects of the present disclosure.
Figure 7A:
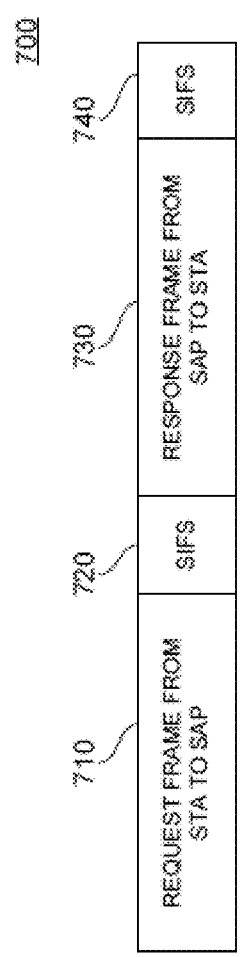
FIG. 7A illustrates a time-slot structure in accordance with certain aspects of the present disclosure.

In one aspect of the invention, the centralized contention based period is divided into equal-size slots, such as shown in FIG. 6B. A time slot is further illustrated in FIG. 7A. At the beginning of a time slot, an STA may transmit a request frame 710 to the SAP. After a guard interval (SIFS) 720, the SAP transmits a response frame 730 to the STA, and a guard interval SIFS follows before another request is allowed. The slot duration should be longer than the maximum duration of a request frame, plus a first SIFS, plus the maximum duration of a response frame, plus a second SIFS. In the following, the combination of request frame and response frame is referred to as a transaction.

In FIG. 6B, the centralized based contention period (C-CBP) is divided into equal-size time slots 664-1-1 to 664-S-N. In the first time slot 664-1-1, the SAP selects receive direction (pattern) number 1 and listens for any request frame transmitted by an STA. If the SAP detects a request frame, the SAP responds by transmitting a response frame after a SIFS guard interval. In the second time slot 664-1-2, the SAP listens in receive direction number 2. This process is repeated for all N SAP receive directions. In the $N^{th}$ slot 664-N, the SAP employs receive direction number N. In the $(N+1)^{th}$ time slot 664-2-1, the SAP listens in receive direction number 1. In the $(N+2)^{th}$ time slot 664-2-2, the SAP listens in direction number 2, and in the $(2N)^{th}$ time slot 664-2-N, the SAP listens while using receive direction number N. In summary, the SAP uses its N receive directions in a cyclic manner. Therefore during the $t^{th}$ time slot, the SAP uses its receive direction number $[(t-1) \bmod N]+1$. A set of N consecutive time slots wherein the SAP cycles (i.e., sweeps) through its receive directions 1 to N is referred to as a time cycle, such as illustrated by time cycles 662-1 to 662-S.

According to one aspect of the invention, an SAP may specify fixed time-cycle boundaries where the first time cycle boundary coincides with the first time slot in the C-CBP. According to another aspect of the invention, an SAP may leave the choice of time-cycle boundaries to different STAs. As an example, an STA might choose a time cycle as time slots 664-1-2 to and including 664-2-1. That is, from an STA's perspective, a time cycle comprises N consecutive time slots, such as time slots 1 to N, or time slots 2 to N+1, or time slots 3 to N+2, etc.

Before using the C-CBP, an STA acquires the beacon, such as described previously. After beacon detection, an SAP acquires knowledge of its preferred SAP transmit direction number m (i.e., the preferred SAP-to-STA transmit direction). The STA determines its preferred receive direction number q by listening to the SAP. Therefore, before using the C-CBP, an STA is equipped with the SAP's preferred transmit direction m and its preferred receive direction n. The values m and q are the preferred uplink pair of directions.

Figure 7B:
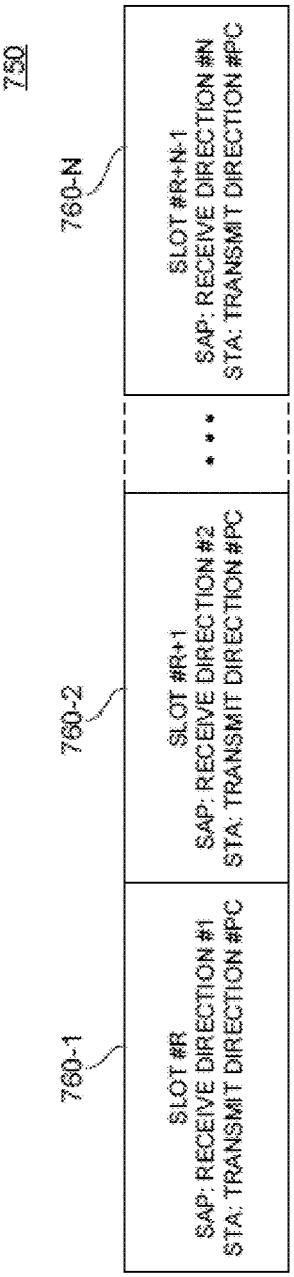
FIG. 7B illustrates a time-cycle structure in accordance with certain aspect of the present disclosure.

According to one aspect of the invention, an STA uses the same transmit direction for each set of N consecutive time slots. This set of N-consecutive time slots may (but not necessarily) be aligned with a time cycle, such as cycles 662-1 to 662-S. For example, if there is only one STA in the network, the STA may transmit a first request frame using its transmit direction #1 in a time slot number 1 and then waits for a response. During this time slot, the SAP uses its receive direction number 1. If no response is detected by the STA, one of the reasons may be that the combination of STA transmit direction number 1 and SAP receive direction number 1 does not have enough LQI. The STA transmits a second request frame in time-slot number 2 while still using its transmit direction number 1, but the SAP employs its receive direction number 2. If the STA does not detect a response, it continues transmitting request frames using the same transmit direction number 1 for each of the N time slots or until a response is detected. If no response is received by the STA after transmitting in the N time slots, the STA uses transmit direction number 2 for the next N time slots or until a response is received. This process may be repeated for each of the STA's transmit directions or until a response is received. Such a process is referred to as a double sweep, wherein the SAP sweeps (i.e., changes its direction) on a time-slot basis (i.e., the SAP's receive direction changes every time slot). The STA sweeps on a cycle basis, that is, it changes its transmit direction every time cycle (i.e., N time slots). This double sweep is illustrated in FIG. 7B, which shows a cycle of N time slots 760-1 to 760-N. During this cycle, the STA uses the same transmit direction number PC during all time slots 760-1 to 760-N, and the SAP changes its receive direction from one time slot to another and cycles through all of its receive directions 1 to N.

According to another aspect of the invention, each request frame sent by the STA comprises information regarding the SAP's preferred transmit direction m. As described above, the STA determines the SAP's preferred transmit direction from the beacon detection and monitoring stage. Once the SAP detects and decodes a request frame sent by an STA, it determines which transmit direction to use for transmitting the response frame to the STA.

Once a response frame is detected by the STA, the STA and SAP have a working pair of directions in both downlink and uplink. That is, the STA determines a working transmit direction toward the SAP and a preferred receive direction when receiving from the SAP. The STA's working transmit direction is not necessarily the best direction. Rather, it may be the first direction that results in a successful transaction (transmission/reception) with the SAP.

The previous aspect of the invention was explained in reference to a single STA communicating with the SAP. When multiple stations contend to access the C-CBP, collisions occur. Therefore, there is a need for a back-off procedure that accounts for the directivity of the stations.

According to one aspect of the invention, an STA uses a set of N random back-off numbers $R(1), R(2), \ldots, R(N)$ for determining the number of back-off time slots (or equivalently, time cycles and time slots within the time cycles) before transmission corresponding to the N SAP receive directions. The $n^{th}$ random number R(n) indicates the number of back-off time slots for a given target SAP receive direction number (i.e., when the SAP employs its receive direction number n). Therefore, the candidate time slots to be considered for back-off random number R(n) are the time slots where the SAP's receive direction is denoted by direction number n. For example, in reference to the numbering scheme in FIG. 6B, these candidate time slots include time-slots number $n+k \times N$ for any k (that is candidate time slots are time-slot numbers n+N, n+2×N, n+3×N, etc.). The random number R(n) determines the time-cycle number, and n determines the time-slot number within the selected time cycle. According to another aspect of the invention, a set of N binary exponential back-off window sizes $W(1), W(2), \ldots, W(N)$ corresponding to the set of N SAP receive directions may be used. The back-off window sizes are initially set to some initial values $2_{A(1)}, 2_{A(2)}, \ldots, 2_{A(N)}$. That is, $W(1)=2_{A(1)}$, $W(2)=2_{A(2)}, \ldots, W(N)=2_{A(N)}$. The initial values $A(1)$, $A(2), \ldots, A(N)$ may be equal or they may be different.

According to one aspect of the invention, an STA that needs to transmit in the C-CBP draws a set of N random numbers $R(1), R(2), \ldots, R(N)$, where R(n) is between 1 and W(n) for $n=1, 2, \ldots, N$. As explained above, the random number R(n) determines the number of back-off time cycles, and the target time slot is the $n^{th}$ time slot in cycle number R(n). According to one aspect of the invention, the STA sorts the set of random numbers in ascending order $R[t(1)] \leq R[t(2)] \leq \ldots \leq R[t(N)]$, where t(1) is the index of the smallest random number, t(2) is the index of the second smallest random number and so on. The first request frame is transmitted using transmit direction number t(1) in the $t(1)^{th}$ time-slot number in cycle number R[t(1)]; that is, in time-slot number $\{R[t(1)]-1\} \times N+t(1)$ if the time slots are numbered 1, 2, 3, ... from the boundary of the C-CBP, such as shown in FIG. 6B. If the transaction is not unsuccessful, the STA transmits a second request frame using transmit direction number t(2) in the $t(2)^{th}$ time slot in cycle number R[t(2)]; that is, in time-slot number $[t(2)-1] \times N+1$; and so on. If R[t(n)] for some n is bigger than the number of slots available in the C-CBP, the transmission is delayed until the next C-CBP in the next superframe. Each time a transaction is unsuccessful, the corresponding back-off window size is increased. According to one aspect of the invention, the back-off window size is doubled every time the transaction is unsuccessful in a given SAP receive direction until it reaches a maximum predetermined value, after which, it is kept unchanged until the transaction is successful or the STA ceases its attempts. For example, after the transmission of the first request frame in transmit direction number t(1) in the t(1)$^{th}$ time slot in cycle number R[t(1)], if the transaction was unsuccessful, the STA doubles the value of the back-off window size W[t(1)]. So if all of the first N trials are unsuccessful, the next set of N random numbers R(1), R(2), . . . , R(N) are drawn from 1 and 2*W(n) for n=1, 2, . . . N, and so on.

Figure 8:
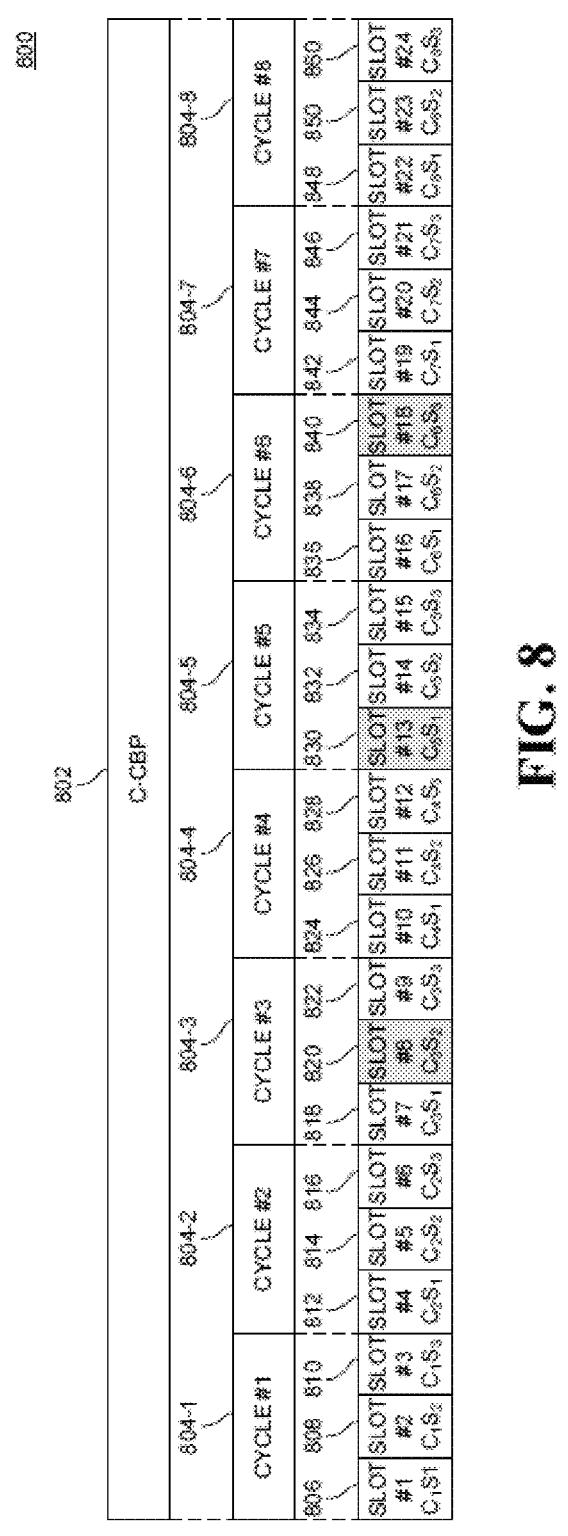

Aspects of the invention are further described with reference to FIG. 8. In this example, the SAP is assumed to have three receive directions (i.e., N=3), and the C-CBP 802 is divided into 24 time slots 806 to 860 corresponding to 8 cycles 804-1 to 804-8, where each cycle 804-1 to 804-8 contains three time slots corresponding to the three SAP receive directions. As before, the SAP changes receive direction from one time slot to another. For example, the SAP uses receive direction number 1 in time-slot number 1, receive direction number 2 in time-slot number 2, receive direction number 3 in time-slot number 3, receive direction number 1 in time-slot number 4, receive direction number 2 in time slot number 5, receive direction number 3 in time-slot number 6, and so on. The above aspect of the invention is explained with exemplary initial back-off window sizes W(1)=W(2)=W(3)=8. The STA draws three random numbers, R(1), R(2) and R(3). In the case depicted in FIG. 8, these random numbers are R(1)=5, R(2)=3, and R(3)=6. The STA sorts these three numbers, as explained previously. In this example, t(1)=2, t(2)=1, and t(3)=3. The STA sends a first request frame using transmit direction number 2 (since t(1)=2) in the 2$^{nd}$ time slot in cycle number 3 (since R[t(1)]=R(2)=3), that is, in time slot 820, which is time slot number 8 (since {R[t(1)]−1}×N+t(1)={R(2)−1}×3+2=8). If the transaction is unsuccessful, the STA transmits a second request frame using transmit direction number 1 (since t(2)=1) in the 1$^{st}$ time slot in cycle number 5 (since R[t(2)]=R(1)=5), that is, in time slot 830, which is time-slot number 13 (since {R[t(2)]−1}×N+t(2)={R(1)−1}×3+1=8). If the second transaction is unsuccessful, the STA transmits a third request frame using transmit direction number 3 (since t(3)=3) in the 3$^{rd}$ time slot in cycle number 6 (since R[t(3)]=R(3)=6), that is, in time slot 840, which is time-slot number 18 (since {R[t(3)]−1}×N+t(3)={R(3)−1}×3+3=18).

According to one aspect of the invention, upon a successful transaction, the STA uses the pair of working directions in which the successful transaction occurred for future communication with the SAP. If, for example, the third transaction was successful, then according to another aspect of the invention, the STA contends only in slots number 3*n for n=1, 2, 3, . . . . That is, if the STA needs to send a request frame in the next superframe, the only candidate slots for possible transmissions are time-slots number 3, 6, 9, 12, 15, 18, 21, and 24. The STA uses a single back-off window size W=W(3) and a single random number R=R(3) to access the C-CBP. Furthermore, the STA uses the same transmit direction it used during the successful transaction. In summary, upon a successful transaction, the STA has knowledge of the following: a) A working transmit direction toward the SAP, referred to as STA transmit direction number p; b) an SAP working receive direction, referred to as the SAP receiver direction number n; c) the STA's preferred receive direction from the SAP, referred to as the STA receive direction number q; and d) the SAP's preferred transmit direction to the STA, referred to as the SAP transmit direction number m. The STA uses this pair of downlink and uplink directions for further communication with the SAP.

According to one aspect of the invention, after a successful transaction with an STA, such as described above, the SAP stores a preferred transmit direction to the STA and, optionally, a working receive direction from the STA. Furthermore, the STA stores a preferred receive direction from the SAP and a working transmit direction toward the SAP.

According to one aspect of the invention, the STA may use the C-CBP to find a preferred downlink using the directional back-off procedure described above. Upon a successful transaction with the SAP, the SAP has a working downlink pair of directions (i.e., the STA working transmit direction number p and the SAP working receive direction number n). This pair of working downlink directions is not necessarily the best pair of directions. The SAP has N receive directions and the STA has P transmit directions. In some aspects of the invention, the SAP surveys all direction combinations (i.e., N×P directions) and the SAP measures the LQI for each combination (nc,pc), where nc=1 to N and pc=1 to P, to find a preferred pair of downlink directions. Upon a first successful transaction, the STA will have tried the following combinations: a) N transactions in N times-slots in which the STA uses direction number 1 and the SAP cycles through its N directions one at a time per time slot; b) N transactions in N times-slots in which the STA uses direction number 2 and the SAP cycles through its N directions one at a time per time slot; c) p−1 transactions in N times-slots in which the STA uses direction number p−1 and the SAP cycles through its N directions one at a time per time slot; and d) n time slots in which the STA uses direction number p and the SAP cycles through directions 1 to n, where in the last time slot, the working pair of directions (the STA transmit direction number p and the SAP receive direction number m) were found. Therefore, the STA has gone through N×(p−1)+n transactions where only the last one was successful. The STA may choose to continue the procedure, that is, the remaining N×P−[N×(p−1)×n] combinations of directions, using the above directional exponential back-off procedure in order to find a preferred downlink pair with a preferred LQI. If the STA completes its trial of all N×P directions, this is a full double sweep. Otherwise, if the STA stops at the first working downlink pair of directions, it is a partial successful double sweep.

According to one aspect of the invention, if an STA performs a full double sweep, the SAP measures the LQI for each successful reception of a request frame and sends the LQI as a feedback in one of the fields of the response frame. Furthermore, the STA may sort LQIs (either all LQIs or just those above a given threshold) and select at least one preferred downlink pair for further transactions with the SAP. The preferred uplink pair is obtained from the beacon frames, as explained above, and may not be part of the C-CBP direction search.

According to one aspect of the invention, if an STA performs a full double sweep, the SAP measures the LQI for each successful reception of a request frame and sends the LQI as a feedback in one of the fields of the response frame. Furthermore, the SAP may sort LQIs (either all LQIs or just those above a given threshold) and then provide feedback to the STA. The STA may select the preferred downlink pair for further transactions with the SAP. The preferred uplink pair is obtained from the beacon frames, as explained above, and may not be part of the C-CBP direction search.

According to one aspect of the invention, upon finding a working or preferred pair of uplink and downlink directions (the SAP's transmit direction number, m, the SAP's receive direction number, n, the STA's transmit direction number, p, and the STA's receive direction number, q) an STA having a request frame to send may use a single back-off window size, W, and a single uniform number generator. According to one aspect of the invention, the STA generates a uniform random number R in the range 1 to W and uses the n$^{th}$ time slot in time-cycle number Z to transmit the request frame using transmit direction number p. If this is the first attempt by the STA to transmit the request frame, then Z=R. if this is not the first attempt by the STA to transmit the request frame, then Z=R+$R_{ACC}$, where $R_{ACC}$ is the number of the time cycle used during the last unsuccessful transmission of the request frame. This procedure is part of the directional slotted ALOHA protocol and is used after the STA has knowledge of at least the working or preferred transmit direction to the SAP.

In the case in which an STA is moving, the preferred or working pair of downlink directions may change.

According to another aspect of the invention, after a full or partial successful double sweep, an STA keeps a list of K downlink direction pairs (for example, a best pair and a second-best pair) and tracks and update the list by using the directional back-off algorithm in the appropriate time slots. In one aspect of the invention, 2 pairs are maintained; a best pair ($p_1,n_1$) of downlink directions and a second-best pair ($p_2,n_2$), where the first index ($p_1$ or $p_2$) refers to the STA transmit direction number and the second index ($n_1$ or $n_2$) refers to the SAP receive direction number. The STA may determine the LQI of its best transmit direction (measured by the SAP and sent back to the STA in the response frame) in every superframe and determine the LQI of the second best transmit direction (measured by the SAP and sent back to the STA in the response frame) during every other superframe. So according to another aspect of the invention, the tracking of the downlink direction pairs occurs at different update rates. When the STA updates the LQI of the best downlink direction pair ($p_1,n_1$), it may use the directional exponential back-off algorithm. For example, the STA uses a back-off window size W1 and draws a random number $R_1(1)$, where $R_1(1)$ is between 1 and W1. The STA sends a request frame in the $n_1^{th}$ slot of cycle number $R_1$ (i.e., in slot number [$R_1(1)$−1]×N+$n_1$). The request frame contains information about the SAP's preferred transmit direction n1 from the STA's perspective, information that is available to the STA as a result of decoding and tracking the beacon frames. The SAP receives the request frame using direction number n1, measures the LQI of the request, and send the LQI back to the STA in the response frame. The SAP transmits the response frame using transmit direction number n1, and the STA receives the response using receive direction number q. Furthermore, the STA may update its list after each feedback or at the end of the double sweep. The request packet and response packet may be sounding packets, which are specialized packets used for measuring and reporting channel conditions and LQI. If the STA does not receive the response packet, or the response packet was not correctly decoded, the STA doubles the back-off window size W1, draws a random number $R_1(2)$, and a second attempt is initiated by sending a request frame in the $n_1^{th}$ time slot of cycle number [$R_1(1)+R_1(2)$], that is, in slot number [$R_1(1)+R_1(2)$−1]×N+$n_1$. The STA waits for a response, and if the response packet is decoded correctly, the STA receives the LQI (which was sent in the response frame by the SAP) and updates its list of K downlink direction pairs. Each item of the list may simply contain the pair of directions (p,n) or the index p, and the corresponding LQI measured by the SAP. In the event of a predetermined number of unsuccessful transactions for the pair (p1,n1), the STA may remove the pair (p1,n1) from the list and select (p2,n2) as an alternative or temporary preferred pair until a better pair is found.

According to one aspect of the invention, if during or after updating the STA's list of K downlink direction pairs, a better downlink direction pair is discovered, the STA may select the better downlink direction pair for further transactions with the SAP.

According to one aspect of the invention, the C-CBP is used for at least one of STA authentication, association, transmit and/or receive direction finding, direction tracking, control frames, service period reservation, command frames, management frames, and data frames, where in all cases, the communication is between the STA and the SAP. An STA may use the directional slotted-ALOHA protocol in the C-CBP to exchange data frames with the SAP. However, the length of the data frames should be selected such that a transaction does not exceed the slot boundary. If the frame is too long, it should be adapted to fit within a time slot along with the response and two SIFS. As another example of a data transaction, the request frame may be a data frame and the response frame may be an immediate acknowledgment. For association, the request frame may be an association request and the response frame may be an association response. Peer-to-peer communications in which neither peer is an SAP is preferably performed in the D-CBP. As another example, the request frame can be a service period reservation request by an STA, and the response frame sent by the SAP may be the SAP denial or acceptance of the service period reservation. Each task (such as association, authentication, service period reservation, etc.) may require more than a simple exchange of two frames (i.e., the request frame and response frame). Rather, a task may require multiple request-response frames. Direction finding may be performed using a full double sweep or a partial successful double sweep. The direction acquisition (finding) can be performed as part of authentication and/or association, or it may be performed independently. When performed independently, it is preferably done before any other task in the C-CBP, such as before authentication, association, and data exchange. If the direction acquisition is accomplished as an independent STA task, the request and response frames used during the sweep may be specialized sounding packets. Alternatively, if the direction acquisition is part of authentication, then the request and response frames are authentication request and response frames.

According to another aspect of the invention, a directional cycle-based ALOHA method is employed wherein the directional exponential back-off is cycle-based rather than slot-based. Specifically, an STA may use a single back-off window size W and a single random number R. The STA generates a random number $R_1$ (1≤$R_1$≤W) that is used for the first N candidate transmissions in N time slots in cycle number R. The STA transmits a first request frame using transmit direction number 1 in the first time slot of time-cycle number R. During the first time slot, the SAP employs its first receive direction. If the STA does not receive a response, the transaction is unsuccessful, so the STA transmits a second request frame in transmit direction number 1 in the second time slot of time-cycle number R. The SAP employs its second receive direction in the second time slot, and the STA listens for a response. This process may be repeated for all N time slots within the time-cycle number R. If there are no successful transactions, the STA doubles its back-off window and generates a second random number $R_2$ (1≤$R_2$≤2W). The random number $R_2$ is used for the second set of N scheduled transmissions in N time slots in cycle number $R_1+R_2$, and the STA repeats its transmission process using transmit direction number 2. This process may be repeated for all the STA transmit directions.

An STA may use both directional cycle-based ALOHA and directional slot-based ALOHA. As an example, an STA may use cycle-based ALOHA for initial direction acquisition (e.g., direction-finding) during a partial or full double sweep. In this case, an STA may finish the double sweep in P (non-consecutive) cycles such that within each time cycle, the STA employs a fixed transmit direction and the SAP sweeps over all of its receive directions, one receive direction per time slot. When a preferred downlink pair of directions is found, the pair may be used for authentication, association, and further data transfer with a directional slotted ALOHA protocol, as previously described.

Figure 9A:
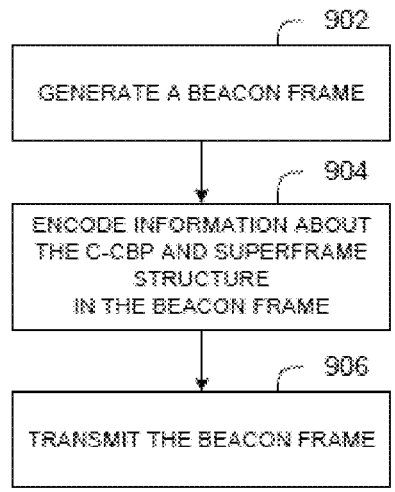
FIG. 9A illustrates an operation for transmitting a beacon frame that may be used within a wireless communication system in accordance with certain aspects of the present disclosure.
Figure 9B:
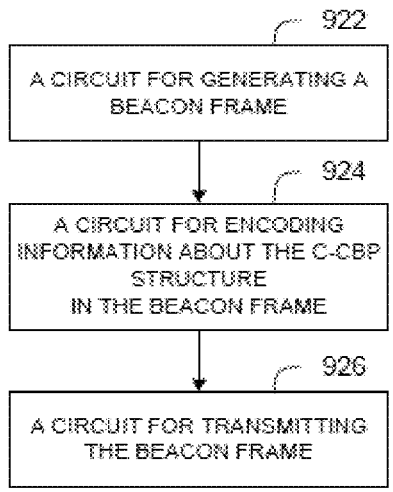
FIG. 9B illustrates components configured for performing the operations illustrated in FIG. 9A.

FIG. 9A illustrates an exemplary method 900 for encoding the centralized contention based period (C-CBP) in a beacon frame. A beacon is generated by an SAP 902, and the C-CBP information and the superframe timing and structure are encoded in the beacon 904 before transmission 906.

Figure 9C:
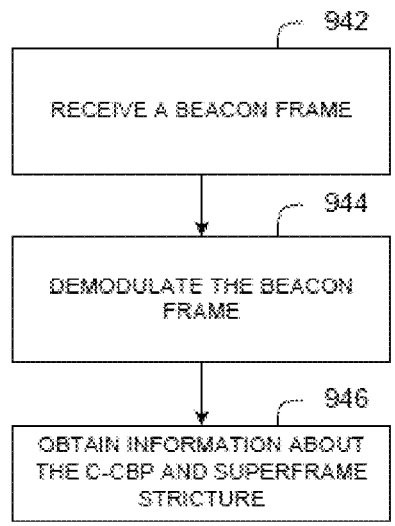
FIG. 9C illustrates operations for processing a beacon frame at the receiver in accordance with certain aspects of the present disclosure.
Figure 9D:
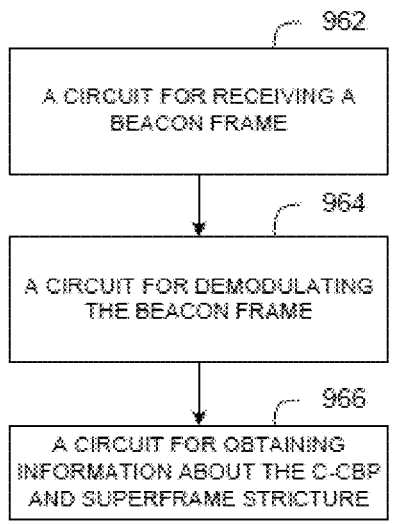
FIG. 9D illustrates components configured for performing the operations illustrated in FIG. 9C.

FIG. 9C illustrates an exemplary method 940 that may be performed by an STA to process a received beacon frame. An STA receives a beacon frame 942, demodulates the beacon frame 944, and extracts C-CBP and superframe information 946.

Figure 10A:
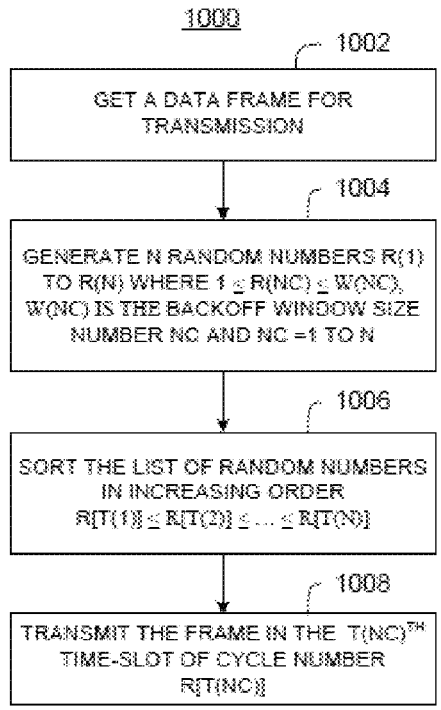
FIG. 10A illustrates a method for performing a directional slotted-ALOHA protocol with respect to certain aspects of the present disclosure.
Figure 10B:
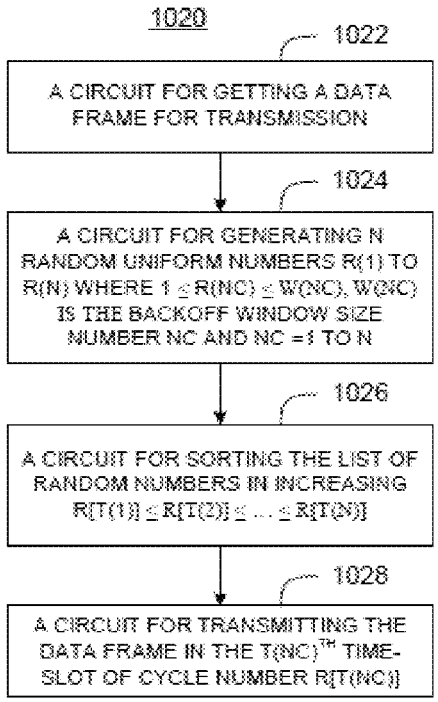
FIG. 10B illustrates components of a system configured for performing the method illustrated in FIG. 10A.

FIG. 10A illustrates an exemplary method 1000 for processing a frame for transmission by an STA using a directional slotted ALOHA protocol. An STA prepares a data frame for transmission 1002. The STA generates a set of N uniform random variables R(1) to R(N) 1004, where N is the number of SAP receive directions and R(n) is in the range of 1 to W(n), where W(n) is the $n^{th}$ back-off window size and n=1 to N. The STA sorts the list of random numbers in increasing order 1006. For example, the sorted list may be expressed by $R[T(1)] \leq R[T(2)] \leq \ldots \leq R[T(N)]$. The STA transmits the frame 1008 in the $T(NC)^{th}$ time slot of cycle number R[T(NC)] for at least some NC=1 to N. FIG. 10B illustrates an apparatus configured for performing the steps shown in FIG. 10A.

Figure 10C:
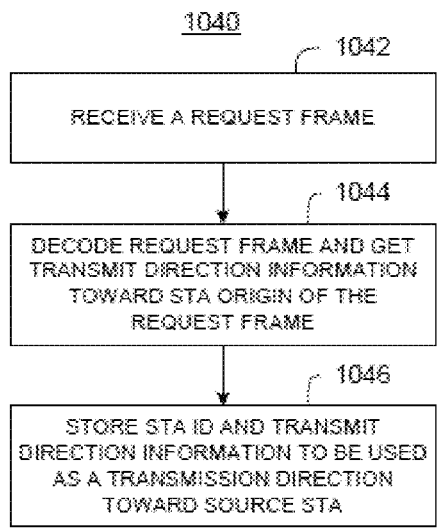
FIG. 10C illustrates a method for processing a frame at the receiver in accordance with certain aspects of the present disclosure.
Figure 10D:
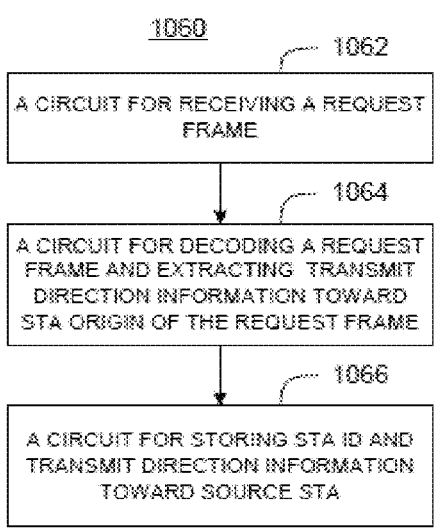
FIG. 10D illustrates an apparatus configured for performing the method illustrated in FIG. 10C.

FIG. 10C illustrates an exemplary method 1040 for processing a request frame by an SAP using a directional slotted ALOHA protocol. An SAP receives a request frame 1042. The SAP detects and decodes the request frame 1044 to extract information encoded in the frame regarding the transmit direction (e.g., a transmit direction index) it should use for sending response frames to the STA. The SAP stores the STA ID and the transmit direction index 1046. FIG. 10D illustrates an apparatus configured for performing the steps shown in FIG. 10C.

Figure 11A:
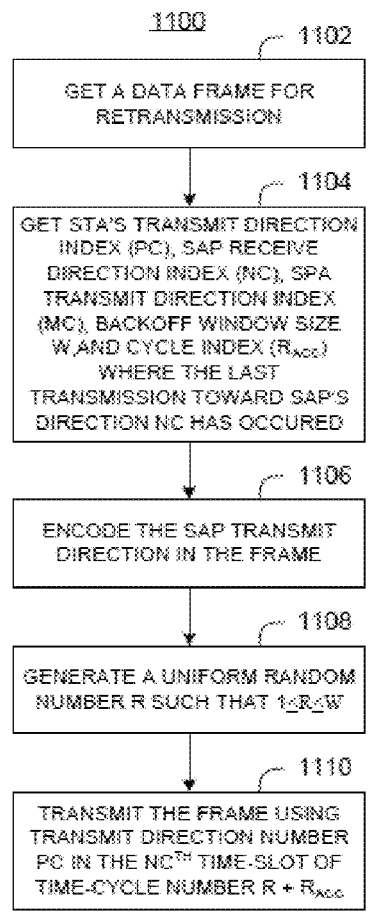
FIG. 11A illustrates a method for retransmitting a frame using a directional slotted ALOHA protocol in accordance with certain aspects of the present disclosure.
Figure 11B:
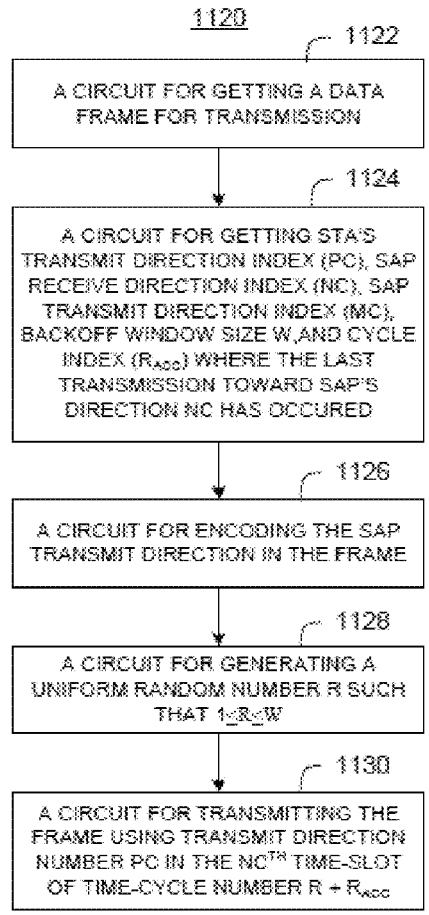
FIG. 11B illustrates an apparatus configured for performing the method illustrated in FIG. 11A.

FIG. 11A illustrates an exemplary method 1100 for frame transmission by an STA using a directional slotted ALOHA protocol wherein the STA has knowledge of the working direction toward the SAP. The STA prepares a frame for retransmission 1102. The STA obtains information 1104 (such as from a previous partial or full double sweep) regarding its transmit direction number (PC), SAP receive direction number (NC), SAP transmit direction number (MC), the back-off window size W, and cycle number ($R_{ACC}$) where the last transmission from the STA toward the SAP with the SAP in receive direction number (NC) has occurred. The STA encodes the SAP's transmit direction (MC) in the request frame 1106 in order to inform the SAP that this is the direction to use to transmit the response frame. The STA generates a uniform random number 1108 in the range 1 to W. The STA transmits the request frame 1110 using transmit direction number (PC) in the $NC^{th}$ time slot of time-cycle number R+$R_{ACC}$. FIG. 11B illustrates an apparatus configured for performing the steps shown in FIG. 11A.

Figure 12A:
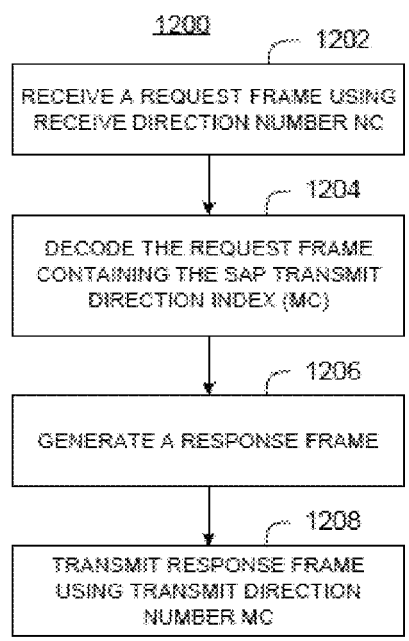
FIG. 12A illustrates a method for processing a frame transmitted using a directional slotted ALOHA protocol at a receiver in accordance with certain aspects of the present disclosure.
Figure 12B:
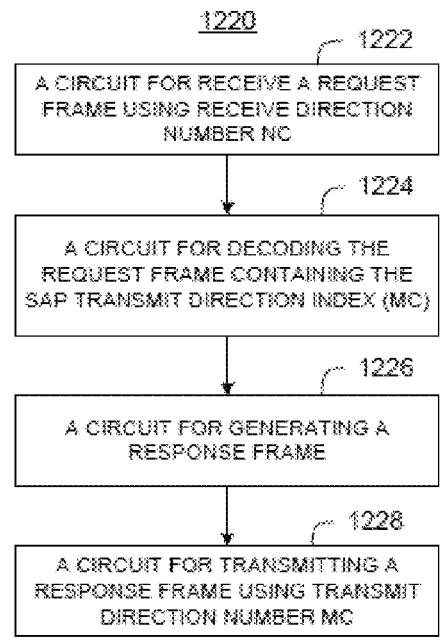
FIG. 12B illustrates an apparatus configured for performing the method illustrated in FIG. 12A.

FIG. 12A illustrates an exemplary method 1200 according to one aspect of the invention. An SAP receives a request frame from an STA 1202 wherein the STA has encoded the transmit direction NC that the SAP should use for transmitting frames to the STA. The SAP decodes the request frame 1204 to obtain the transmit direction NC it should use for responding back to the STA. The SAP generates a response frame 1206 and transmits the response frame 1208 using transmit direction number NC. FIG. 12B illustrates an apparatus configured for performing the steps shown in FIG. 12A.

Figure 13A:
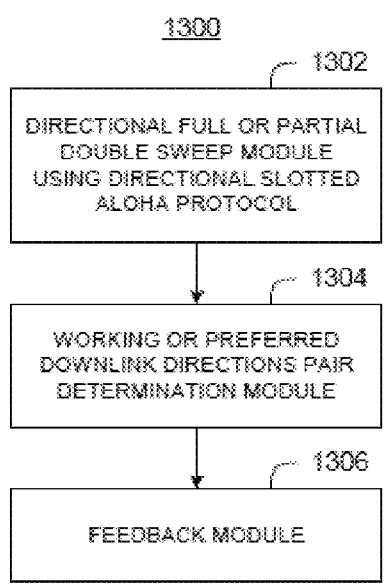
FIG. 13A illustrates a method for performing a double sweep using a directional slotted ALOHA protocol in accordance with certain aspects of the present disclosure.
Figure 13B:
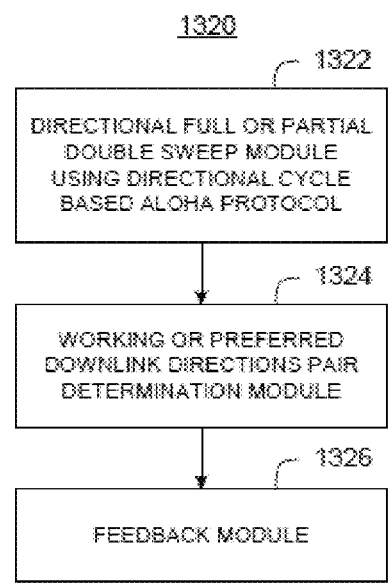
FIG. 13B illustrates an apparatus configured for performing the method illustrated in FIG. 13A.

FIG. 13A illustrates an exemplary method 1300 performed by an STA to find at least one working or preferred downlink direction. The STA performs a full or partial double sweep using the directional slotted ALOHA protocol 1302. The STA determines preferred or working downlink directions from response frames received from the SAP 1304. The STA transmits the preferable or working downlink directions 1306 to the SAP. FIG. 13B illustrates an apparatus configured for performing the steps shown in FIG. 13A.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may have corresponding counterpart means-plus-function components with similar numbering. For example, blocks 902-906, 942-946, 1002-1008, 1042-1046, 1102-1110 1202-1208, and 1302-1306, illustrated in FIGS. 9A, 9C, 10A, 10C, 11A, 12A and 13A correspond to circuit blocks 922-926, 962-966, 1022-1028, 1062-1066, 1122-1130, 1222-1228 and 1322-1326 illustrated in FIGS. 9B, 9D, 10B, 10D, 11B, 12B and 13B.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CDROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The techniques provided herein may be utilized in a variety of applications. For certain aspects, the techniques presented herein may be incorporated in a base station, a mobile handset, a personal digital assistant (PDA) or other type of wireless device that operate in UWB part of spectrum with processing logic and elements to perform the techniques provided herein.

The invention claimed is:

1. A method operating on at least a wireless device, the method comprising:
    selecting a sequence of time slots paired with a plurality of transmit directions for transmitting at least one request frame from a first wireless device to a second wireless device;
    listening for the at least one request frame at the second wireless device by employing a different one of a plurality of receive directions in each of the time slots;
    transmitting at least one response frame from the second wireless device to the first wireless device;
    listening for the at least one response frame at the first wireless device; and
    selecting a preferred set of uplink and downlink directions for further communication between the first wireless device and the second wireless device.

2. The method of claim 1, wherein the first wireless device employs a different transmit direction for transmitting in each of a plurality of sets of N time slots, where N equals the plurality of receive directions.

3. The method of claim 1, wherein a time cycle comprises a plurality N of consecutive time slots, where N equals the plurality of receive directions; and wherein listening for the at least one request frame at the second wireless device comprises cycling through the plurality of receive directions in each time cycle.

4. The method of claim 3, wherein the first wireless device employs only one transmit direction during each time cycle.

5. The method of claim 3, wherein the first wireless device employs a different transmit direction for each of a plurality of time cycles.

6. The method of claim 3, wherein each time cycle has a time-cycle boundary selected by at least one of the first wireless device and the second wireless device.

7. The method of claim 1, wherein each time slot comprises a request frame slot, a first guard interval, a response frame slot, and a second guard interval.

8. The method of claim 1, wherein the request frame comprises a preferred transmit direction for transmitting from the second wireless device to the first wireless device.

9. The method of claim 1, wherein the first wireless device employs a set of back-off numbers corresponding to the receive directions for determining back-off times for transmitting request frames.

10. The method of claim 1, wherein the first wireless device employs an algorithm for selecting transmit directions and time cycles for transmitting request frames.

11. The method of claim 1, wherein the set of uplink and downlink directions comprises a preferred transmit direction for transmitting from the second wireless device to the first wireless device, a preferred receive direction for receiving transmissions from the second wireless device to the first wireless device, and a preferred transmit direction for transmitting from the first wireless device to the second wireless device.

12. The method of claim 1, wherein the set of uplink and downlink directions comprises a pair of uplink directions and a pair of downlink directions.

13. The method of claim 1, wherein the set of uplink and downlink directions comprises at least one of directions providing optimal link quality indicator and directions having an optimal link quality indicator above a predetermined threshold.

14. The method of claim 1, wherein selecting the set comprises performing at least one of a full double sweep and a partial double sweep of all possible uplink and downlink direction pairs.

15. The method of claim 1, wherein selecting the set is performed by the first wireless device.

16. The method of claim 1, wherein selecting the set further comprises measuring an uplink link quality indicator at the second wireless device and transmitting the uplink link quality indicator to the first wireless device.

17. The method of claim 1, wherein selecting the set comprises selecting an uplink pair from beacon frames and selecting a downlink pair during a C-CBP direction search.

18. The method of claim 1, further comprising maintaining a plurality of downlink direction pairs, updating a link quality indicator measurement for each of the plurality of downlink direction pairs, and updating at least one of the set of uplink and downlink directions.

19. The method of claim 1 configured to perform at least one of directional slotted ALOHA and directional cycle-based ALOHA.

20. The method of claim 1 further configured for performing at least one of authentication, association, direction finding, direction tracking, communicating control frames, service period reservation, communicating command frames, communicating management frames, and communicating data frames.

21. A computer program residing on a non-transient computer-readable memory configured to perform the method recited in claim 1.

22. A wireless system comprising:
    means for selecting a sequence of time slots paired with a plurality of transmit directions for transmitting at least one request frame from a first wireless device to a second wireless device;
    means for listening for the at least one request frame at the second wireless device by employing a different one of a plurality of receive directions in each of the time slots;
    means for transmitting at least one response frame from the second wireless device to the first wireless device;
    means for listening for the at least one response frame at the first wireless device; and
    means for selecting a preferred set of uplink and downlink directions for further communication between the first wireless device and the second wireless device.

23. A method operating on at least a first wireless device, the method comprising:
    selecting a sequence of time slots paired with a plurality of transmit directions for transmitting at least one request frame from the first wireless device to a second wireless device, the second wireless device employing a different one of a plurality of receive directions for each of the time slots;
    listening for at least one response frame transmitted by the second wireless device to the first wireless device; and
    selecting a preferred set of uplink and downlink directions for further communication between the first wireless device and the second wireless device.

24. The method of claim 23, wherein selecting a sequence further comprises employing a first transmit direction for a first plurality N of the time slots, and a second transmit direction for a second plurality N of the time slots, where N equals the plurality of receive directions.

25. The method of claim 23, wherein a time cycle comprises a plurality N of consecutive time slots, and transmitting the at least one request frame comprises at least one of employing only one transmit direction during each time cycle, and employing a different transmit direction for each of a plurality of time cycles.

26. The method of claim 25, wherein each time cycle has a time-cycle boundary selected by at least one of the first wireless device and the second wireless device.

27. The method of claim 23, wherein each time slot comprises a request frame slot, a first guard interval, a response frame slot, and a second guard interval.

28. The method of claim 23, wherein the request frame comprises a preferred transmit direction for transmitting from the second wireless device to the first wireless device.

29. The method of claim 23, wherein selecting the sequence further comprises employing a set of back-off numbers corresponding to the plurality of receive directions for determining back-off times for transmitting the at least one request frame.

30. The method of claim 23, wherein selecting the sequence further comprises employing an algorithm for selecting transmit directions and time cycles for transmitting request frames.

31. The method of claim 23, wherein the set of uplink and downlink directions comprises a preferred transmit direction for transmitting from the second wireless device to the first wireless device, a preferred receive direction for receiving transmissions from the second wireless device to the first wireless device, and a preferred transmit direction for transmitting from the first wireless device to the second wireless device.

32. The method of claim 23, wherein the set of uplink and downlink directions comprises a pair of uplink directions and a pair of downlink directions.

33. The method of claim 23, wherein the set of uplink and downlink directions comprises at least one of directions providing optimal link quality indicator and directions having an optimal link quality indicator above a predetermined threshold.

34. The method of claim 23, wherein selecting the set comprises performing at least one of a full double sweep and a partial double sweep of all possible uplink and downlink direction pairs.

35. The method of claim 23, wherein selecting the set further comprises processing an uplink link quality indicator measured at the second wireless device.

36. The method of claim 23, wherein selecting the set comprises selecting an uplink pair from beacon frames and selecting a downlink pair during a C-CBP direction search.

37. The method of claim 23, further comprising maintaining a plurality of downlink direction pairs, updating a link quality indicator measurement for each of the plurality of downlink direction pairs, and updating at least one of the set of uplink and downlink directions.

38. The method of claim 23 configured to perform at least one of directional slotted ALOHA and directional cycle-based ALOHA.

39. The method of claim 23 further configured for performing at least one of authentication, association, direction finding, direction tracking, communicating control frames, service period reservation, communicating command frames, communicating management frames, and communicating data frames.

40. A computer program residing on a non-transient computer-readable memory configured to perform the method recited in claim 23.

41. In a wireless communication system, an apparatus comprising:
a memory storage device configured to store computer readable instructions for selecting transmit and receive directions for communicating between a plurality of directional wireless devices; and
a processing unit coupled to the memory storage device, configured to:
select a sequence of time slots paired with a plurality of transmit directions for transmitting at least one request frame from a first wireless device to a second wireless device, the second wireless device employing a different one of a plurality of receive directions for each of the time slots;
listen for at least one response frame transmitted by the second wireless device; and
select a preferred set of uplink and downlink directions for further communication between the first wireless device and the second wireless device.

42. A first wireless device, comprising:
means for selecting a sequence of time slots paired with a plurality of transmit directions for transmitting at least one request frame from the first wireless device to a second wireless device, the second wireless device employing a different one of a plurality of receive directions for each of the time slots;
means for listening for at least one response frame transmitted by the second wireless device; and
means for selecting a preferred set of uplink and downlink directions for further communication between the first wireless device and the second wireless device.

43. A method operating on at least a first wireless device, the method comprising:
employing a different one of a plurality of receive directions for each of a sequence of time slots to listen for at least one request frame transmitted by a second wireless device;
transmitting at least one response frame to the second wireless device in response to a received request frame; and
selecting a preferred set of uplink and downlink directions for further communication between the first wireless device and the second wireless device.

44. The method of claim 43, wherein a time cycle comprises a plurality N of consecutive time slots, where N equals the plurality of receive directions; and wherein employing a different one of the plurality of receive directions comprises cycling through the plurality of receive directions in each time cycle.

45. The method of claim 44, wherein each time cycle has a time-cycle boundary selected by at least one of the first wireless device and the second wireless device.

46. The method of claim 43, wherein each time slot comprises a request frame slot, a first guard interval, a response frame slot, and a second guard interval.

47. The method of claim 43, wherein the at least one request frame comprises a preferred transmit direction for transmitting from the first wireless device to the second wireless device.

48. The method of claim 43, wherein the set of uplink and downlink directions comprises a preferred transmit direction for transmitting from the first wireless device to the second wireless device, a preferred receive direction for receiving transmissions from the first wireless device to the second wireless device, and a preferred transmit direction for transmitting from the second wireless device to the first wireless device.

49. The method of claim 43, wherein the set of uplink and downlink directions comprises a pair of uplink directions and a pair of downlink directions.

50. The method of claim 43, wherein the set of uplink and downlink directions comprises at least one of directions providing optimal link quality indicator and directions having an optimal link quality indicator above a predetermined threshold.

51. The method of claim 43, wherein selecting the set comprises performing at least one of a full double sweep and a partial double sweep of all possible uplink and downlink direction pairs.

52. The method of claim 43, wherein selecting the set is performed by the second wireless device.

53. The method of claim 43, wherein selecting the set further comprises measuring an uplink link quality indicator at the first wireless device and transmitting the uplink link quality indicator to the second wireless device.

54. The method of claim 43 configured to perform at least one of directional slotted ALOHA and directional cycle-based ALOHA.

55. The method of claim 43 further configured for performing at least one of authentication, association, direction finding, direction tracking, communicating control frames, service period reservation, communicating command frames, communicating management frames, and communicating data frames.

56. A computer program residing on a non-transient computer-readable memory configured to perform the method recited in claim 43.

57. In a wireless communication system, an apparatus comprising:
a memory storage device configured to store computer readable instructions for selecting transmit and receive directions for communicating between a first wireless device and a second wireless device; and
a processing unit coupled to the memory storage device, configured to:
employ a different one of a plurality of receive directions for each of a sequence of time slots to listen for at least one request frame transmitted by the second wireless device;
transmit at least one response frame to the second wireless device in response to a received request frame; and
select a preferred set of uplink and downlink directions for further communication between the first wireless device and the second wireless device.

58. A first wireless device, comprising:
means for employing a different one of a plurality of receive directions for each of a sequence of time slots to listen for at least one request frame transmitted by a second wireless device;
means for transmitting at least one response frame to the second wireless device in response to a received request frame; and
means for selecting a preferred set of uplink and downlink directions for further communication between the first wireless device and the second wireless device.

59. A method operating on at least a first wireless device, the method comprising:
- generating a plurality of time cycle numbers, the plurality of time cycle numbers being equal to a plurality of receive directions employed by a second wireless device, each of the time cycle numbers being associated with one of the receive directions and having a value within a predetermined back-off window size;
- sequentially organizing the plurality of time cycle numbers with respect to their values for producing a sequence of time cycle numbers; and
- generating a sequence of time slot numbers from the sequence of time cycle numbers and the plurality of receive directions, the sequence of time slot numbers being used to select time slots for transmitting a frame to the second wireless device.

60. A computer program residing on a non-transient computer-readable memory configured to perform the method recited in claim 59.

61. In a wireless communication system, an apparatus comprising:
- a memory storage device configured to store computer readable instructions for selecting time slots for transmitting request frames from a first directional wireless device to a second directional wireless device; and
- a processing unit coupled to the memory storage device, configured to:
  - generate a plurality of time cycle numbers, the plurality of time cycle numbers being equal to a plurality of receive directions employed by the second wireless device, each of the time cycle numbers being associated with one of the receive directions and having a value within a predetermined back-off window size;
  - sequentially organize the plurality of time cycle numbers with respect to their values for producing a sequence of time cycle numbers; and
  - generate a sequence of time slot numbers from the sequence of time cycle numbers and the plurality of receive directions, the sequence of time slot numbers being used to select time slots for transmitting a frame to the second wireless device.

62. A first wireless device, comprising:

means for generating a plurality of time cycle numbers, the plurality of time cycle numbers being equal to a plurality of receive directions employed by a second wireless device, each of the time cycle numbers being associated with one of the receive directions and having a value within a predetermined back-off window size;

means for sequentially organizing the plurality of time cycle numbers with respect to their values for producing a sequence of time cycle numbers; and means for generating a sequence of time slot numbers from the sequence of time cycle numbers and the plurality of receive directions, the sequence of time slot numbers being used to select time slots for transmitting a frame to the second wireless device.

* * * * *